US012763905B2

(12) United States Patent
Abdelghaffar et al.

(10) Patent No.: US 12,763,905 B2
(45) Date of Patent: Oct. 13, 2026

(54) REFERENCE SIGNAL TRANSMISSION IN SUBBAND FULL-DUPLEX AND NON-SUBBAND FULL-DUPLEX SLOTS

(71) Applicant: QUALCOMM Incorporated, San Diego, CA (US)

(72) Inventors: Muhammad Sayed Khairy Abdelghaffar, San Jose, CA (US); Abdelrahman Mohamed Ahmed Mohamed Ibrahim, San Diego, CA (US); Yi Huang, San Diego, CA (US); Gokul Sridharan, Sunnyvale, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 410 days.

(21) Appl. No.: 18/478,037

(22) Filed: Sep. 29, 2023

(65) Prior Publication Data

US 2025/0112744 A1 Apr. 3, 2025

(51) Int. Cl.
*H04L 5/00* (2006.01)
*H04L 5/14* (2006.01)

(52) U.S. Cl.
CPC .............. *H04L 5/0051* (2013.01); *H04L 5/14* (2013.01)

(58) Field of Classification Search
CPC ................................ H04L 5/0051; H04L 5/14
See application file for complete search history.

(56) References Cited

U.S. PATENT DOCUMENTS

2023/0276504 A1 8/2023 Kim et al.

FOREIGN PATENT DOCUMENTS

| | | | | |
|---|---|---|---|---|
| CN | 121694002 A * | 3/2026 | ........... | H04L 5/1461 |
| WO | WO-2024071886 A1 * | 4/2024 | ............... | H04L 1/08 |
| WO | WO-2024209632 A1 * | 10/2024 | ........ | H04W 72/0453 |
| WO | WO-2024229826 A1 | 11/2024 | | |

OTHER PUBLICATIONS

Partial International Search Report—PCT/US2024/043436—ISA/EPO—Dec. 10, 2024 (2308170WO).
International Search Report and Written Opinion—PCT/US2024/043436—ISA/EPO—Mar. 14, 2025 (2308170WO).

(Continued)

*Primary Examiner* — Derrick V Rose
(74) *Attorney, Agent, or Firm* — Holland & Hart LLP

(57) ABSTRACT

Methods, systems, and devices for wireless communications are described. A user equipment (UE) may receive an indication of resource parameters for performing sounding reference signal transmissions during a slot comprising at least one subband full-duplex symbol and at least one non-subband full-duplex symbol. The UE may perform multi-symbol sounding reference signal transmissions during the slot according to a transmission scheme associated with the resource parameters, the transmission scheme defining a transmit or drop rule based on a first subset of sounding reference signal transmissions being scheduled in the at least one subband full-duplex symbol of the slot and a second subset of sounding reference signal transmissions being scheduled in the at least one non-subband full-duplex symbol of the slot.

30 Claims, 19 Drawing Sheets

(56) References Cited

OTHER PUBLICATIONS

Mediatek Inc: "Discussion on Subband Non-Overlapping Full Duplex For NR", 3GPP TSG RAN WG1 Meeting #114, R1-2306815, 3rd Generation Partnership Project, Mobile Competence Centre, 650, Route Des Lucioles, F-06921 Sophia-Antipolis Cedex, France, vol. RAN WG1, No. Toulouse, France, Aug. 21, 2023-Aug. 25, 2023, Aug. 11, 2023, 18 pages, XP052436048, Section 2.4.6, Frequency hopping for PUSCH/PUCCH/SRS.

* cited by examiner

REFERENCE SIGNAL TRANSMISSION IN SUBBAND FULL-DUPLEX AND NON-SUBBAND FULL-DUPLEX SLOTS

TECHNICAL FIELD

The following relates to wireless communications, including reference signal transmission in subband full-duplex and non-subband full-duplex slots.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support reference signal transmission in subband full-duplex (SBFD) and non-SBFD slots. For example, the described techniques provide various mechanisms that support a user equipment (UE) performing or dropping sounding reference signal (SRS) transmissions when the transmissions overlap the SBFD/non-SBFD boundary. For example, the UE may receive an indication of resource parameters. The resource parameters identify resources and the associated parameters for the UE to perform the multi-symbol based SRS transmissions during the mixed SBFD and non-SBFD symbols slot. The UE may perform the symbol-based SRS transmissions according to a transmission scheme associated with the resource parameters. The transmission scheme may generally identify or otherwise define a transmit or drop rule applicable when the SRS transmissions span the SBFD and non-SBFD symbols.

Additionally, or alternatively, the UE may receive the resource parameters for the SRS transmissions when the SBFD and non-SBFD symbol slot includes a guard period. The UE may perform the multi-symbol SRS transmissions according to the transmission scheme. The transmission scheme in this example may be based on the mixture of SBFD and non-SBFD symbols along with the guard period. The UE may use the transition period (e.g., the guard period) or may drop the SRS transmissions after the transition period.

A method for wireless communications by a UE is described. The method may include receiving an indication of resource parameters for performing SRS transmissions during a slot including at least one SBFD symbol and at least one non-SBFD symbol and performing multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one non-SBFD symbol of the slot.

A UE for wireless communications is described. The UE may include one or more memories storing processor executable code, and one or more processors coupled (e.g., operatively, communicatively, functionally, electronically, or electrically) with the one or more memories. The one or more processors may individually or collectively operable to execute the code (e.g., directly, indirectly, after pre-processing, without pre-processing) to cause the UE to receive an indication of resource parameters for performing SRS transmissions during a slot including at least one SBFD symbol and at least one non-SBFD symbol and perform multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one non-SBFD symbol of the slot.

Another UE for wireless communications is described. The UE may include means for receiving an indication of resource parameters for performing SRS transmissions during a slot including at least one SBFD symbol and at least one non-SBFD symbol and means for performing multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one non-SBFD symbol of the slot.

A non-transitory computer-readable medium storing code for wireless communications is described. The code may include instructions executable by a processor (e.g., directly, indirectly, after pre-processing, without pre-processing) to receive an indication of resource parameters for performing SRS transmissions during a slot including at least one SBFD symbol and at least one non-SBFD symbol and perform multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one non-SBFD symbol of the slot.

In some examples of the method, user equipment (UEs), and non-transitory computer-readable medium described herein, a frequency resource for the first subset of SRS transmissions and the second subset of SRS transmissions may be within an uplink subband during the at least one SBFD symbol and during the at least one non-SBFD symbol and the transmission scheme may be based on the frequency resource.

Some examples of the method, user equipment (UEs), and non-transitory computer-readable medium described herein may further include operations, features, means, or instructions for dropping the first subset of SRS transmissions and the second subset of SRS transmissions according to the transmission scheme.

Some examples of the method, user equipment (UEs), and non-transitory computer-readable medium described herein may further include operations, features, means, or instructions for dropping the second subset of SRS transmissions and performing the first subset of SRS transmissions according to the transmission scheme.

Some examples of the method, user equipment (UEs), and non-transitory computer-readable medium described herein may further include operations, features, means, or instructions for dropping the first subset of SRS transmissions and performing the second subset of SRS transmissions according to the transmission scheme.

Some examples of the method, user equipment (UEs), and non-transitory computer-readable medium described herein may further include operations, features, means, or instructions for performing the first subset of SRS transmissions and the second subset of SRS transmissions according to the transmission scheme.

In some examples of the method, user equipment (UEs), and non-transitory computer-readable medium described herein, the transmission scheme may be based on a phase continuity being maintained, a same set of transmission parameters being applied, a presence or an absence of a guard period, or a combination thereof, between the first subset of SRS transmissions and the second subset of SRS transmissions.

In some examples of the method, user equipment (UEs), and non-transitory computer-readable medium described herein, the transmission scheme may be based on a presence or an absence of a guard period between the at least one SBFD symbol and the at least one non-SBFD symbol.

In some examples of the method, user equipment (UEs), and non-transitory computer-readable medium described herein, a frequency resource for the first subset of SRS transmissions and the second subset of SRS transmissions may be wider than an uplink subband during the at least one SBFD symbol and may be within an uplink bandwidth during the at least one non-SBFD symbol and the transmission scheme may be based on the frequency resource.

Some examples of the method, user equipment (UEs), and non-transitory computer-readable medium described herein may further include operations, features, means, or instructions for dropping the first subset of SRS transmissions and the second subset of SRS transmissions according to the transmission scheme.

Some examples of the method, user equipment (UEs), and non-transitory computer-readable medium described herein may further include operations, features, means, or instructions for dropping the first subset of SRS transmissions and performing the second subset of SRS transmissions according to the transmission scheme.

Some examples of the method, user equipment (UEs), and non-transitory computer-readable medium described herein may further include operations, features, means, or instructions for performing the first subset of SRS transmissions during the at least one SBFD symbol and the second subset of SRS transmissions during the at least one non-SBFD symbol according to a truncated SRS sequence, the truncated SRS sequence based on the transmission scheme.

Some examples of the method, user equipment (UEs), and non-transitory computer-readable medium described herein may further include operations, features, means, or instructions for performing the first subset of SRS transmissions during the at least one SBFD symbol and the second subset of SRS transmissions during the at least one non-SBFD symbol according to an updated SRS sequence, where a length of the updated SRS sequence may be based on the transmission scheme within an uplink subband frequency resource.

In some examples of the method, user equipment (UEs), and non-transitory computer-readable medium described herein, the multi-symbol SRS transmissions include frequency hopping with a first hop of the frequency hopping including the first subset of SRS transmissions during the at least one SBFD symbol and a second hop of the frequency hopping including the second subset of SRS transmissions during the at least one non-SBFD symbol and the transmission scheme may be based on the frequency hopping.

Some examples of the method, user equipment (UEs), and non-transitory computer-readable medium described herein may further include operations, features, means, or instructions for performing the first subset of SRS transmissions and the second subset of SRS transmissions according to the transmission scheme.

Some examples of the method, user equipment (UEs), and non-transitory computer-readable medium described herein may further include operations, features, means, or instructions for performing or dropping one or more instances of the second subset of SRS transmissions according to a presence or an absence of a guard period scheduled between the at least one SBFD symbol and the at least one non-SBFD symbol.

In some examples of the method, user equipment (UEs), and non-transitory computer-readable medium described herein, the multi-symbol SRS transmissions include frequency hopping with a first hop of the frequency hopping including the first subset of SRS transmissions during the at least one SBFD symbol and a second hop of the frequency hopping including a first instance of the second subset of SRS transmissions during the at least one SBFD symbol and a second instance of the second subset of SRS transmissions during the at least one non-SBFD symbol and the transmission scheme may be based on the frequency hopping.

Some examples of the method, user equipment (UEs), and non-transitory computer-readable medium described herein may further include operations, features, means, or instructions for performing the first subset of SRS transmissions and the second subset of SRS transmissions according to the transmission scheme.

In some examples of the method, user equipment (UEs), and non-transitory computer-readable medium described herein, the transmission scheme may be based on a phase continuity being maintained, a same set of transmission parameters being applied, a presence or an absence of a guard period, or a combination thereof, between the first subset of SRS transmissions and the second subset of SRS transmissions.

Some examples of the method, user equipment (UEs), and non-transitory computer-readable medium described herein may further include operations, features, means, or instructions for performing the first subset of SRS transmissions and dropping the first instance, the second instance, or both, of the second subset of SRS transmissions according to the transmission scheme.

A method for wireless communications by a UE is described. The method may include receiving an indication of resource parameters for performing SRS transmissions during a slot including at least one SBFD symbol, at least one non-SBFD symbol, and a gap period between the at least one SBFD symbol and the at least one non-SBFD symbol and performing multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one SBFD symbol, in the at least one non-SBFD symbol, or both, of the slot and a location of a SRS guard period relative to a transition between the at least one SBFD symbol and the at least one non-SBFD symbol.

A UE for wireless communications is described. The UE may include one or more memories storing processor executable code, and one or more processors coupled (e.g., operatively, communicatively, functionally, electronically, or electrically) with the one or more memories. The one or more processors may individually or collectively operable to execute (e.g., directly, indirectly, after pre-processing, without pre-processing) the code to cause the UE to receive an indication of resource parameters for performing SRS transmissions during a slot including at least one SBFD symbol, at least one non-SBFD symbol, and a gap period between the at least one SBFD symbol and the at least one non-SBFD symbol and perform multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one SBFD symbol, in the at least one non-SBFD symbol, or both, of the slot and a location of a SRS guard period relative to a transition between the at least one SBFD symbol and the at least one non-SBFD symbol.

Another UE for wireless communications is described. The UE may include means for receiving an indication of resource parameters for performing SRS transmissions during a slot including at least one SBFD symbol, at least one non-SBFD symbol, and a gap period between the at least one SBFD symbol and the at least one non-SBFD symbol and means for performing multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one SBFD symbol, in the at least one non-SBFD symbol, or both, of the slot and a location of a SRS guard period relative to a transition between the at least one SBFD symbol and the at least one non-SBFD symbol.

A non-transitory computer-readable medium storing code for wireless communications is described. The code may include instructions executable by a processor (e.g., directly, indirectly, after pre-processing, without pre-processing) to receive an indication of resource parameters for performing SRS transmissions during a slot including at least one SBFD symbol, at least one non-SBFD symbol, and a gap period between the at least one SBFD symbol and the at least one non-SBFD symbol and perform multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one SBFD symbol, in the at least one non-SBFD symbol, or both, of the slot and a location of a SRS guard period relative to a transition between the at least one SBFD symbol and the at least one non-SBFD symbol.

Some examples of the method, user equipment (UEs), and non-transitory computer-readable medium described herein may further include operations, features, means, or instructions for performing the first subset of SRS transmissions and the second subset of SRS transmissions and dropping an SRS transmission scheduled during the gap period according to the transmission scheme.

Some examples of the method, user equipment (UEs), and non-transitory computer-readable medium described herein may further include operations, features, means, or instructions for performing the first subset of SRS transmissions and dropping the second subset of SRS transmissions according to the transmission scheme.

A method for wireless communications by a network entity is described. The method may include transmitting, to a UE, an indication of resource parameters for the UE to perform SRS transmissions during a slot including at least one SBFD symbol and at least one non-SBFD symbol and receiving multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one non-SBFD symbol of the slot.

A network entity for wireless communications is described. The network entity may include one or more memories storing processor executable code, and one or more processors coupled (e.g., operatively, communicatively, functionally, electronically, or electrically) with the one or more memories. The one or more processors may individually or collectively operable to execute the code (e.g., directly, indirectly, after pre-processing, without pre-processing) to cause the network entity to transmit, to a UE, an indication of resource parameters for the UE to perform SRS transmissions during a slot including at least one SBFD symbol and at least one non-SBFD symbol and receive multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one non-SBFD symbol of the slot.

Another network entity for wireless communications is described. The network entity may include means for transmitting, to a UE, an indication of resource parameters for the UE to perform SRS transmissions during a slot including at least one SBFD symbol and at least one non-SBFD symbol and means for receiving multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one non-SBFD symbol of the slot.

A non-transitory computer-readable medium storing code for wireless communications is described. The code may include instructions executable by a processor (e.g., directly, indirectly, after pre-processing, without pre-processing) to transmit, to a UE, an indication of resource parameters for the UE to perform SRS transmissions during a slot including at least one SBFD symbol and at least one non-SBFD symbol and receive multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one non-SBFD symbol of the slot.

In some examples of the method, network entities, and non-transitory computer-readable medium described herein, a frequency resource for the first subset of SRS transmissions and the second subset of SRS transmissions may be within an uplink subband during the at least one SBFD symbol and during the at least one non-SBFD symbol and the transmission scheme may be based on the frequency resource.

Some examples of the method, network entities, and non-transitory computer-readable medium described herein may further include operations, features, means, or instructions for dropping reception of the first subset of SRS transmissions and the second subset of SRS transmissions according to the transmission scheme.

Some examples of the method, network entities, and non-transitory computer-readable medium described herein may further include operations, features, means, or instructions for dropping reception of the second subset of SRS transmissions and receiving the first subset of SRS transmissions according to the transmission scheme.

Some examples of the method, network entities, and non-transitory computer-readable medium described herein may further include operations, features, means, or instructions for dropping reception of the first subset of SRS transmissions and receiving the second subset of SRS transmissions according to the transmission scheme.

Some examples of the method, network entities, and non-transitory computer-readable medium described herein may further include operations, features, means, or instructions for receiving the first subset of SRS transmissions and the second subset of SRS transmissions according to the transmission scheme.

In some examples of the method, network entities, and non-transitory computer-readable medium described herein, the transmission scheme may be based on a phase continuity being maintained, a same set of transmission parameters being applied, a presence or an absence of a guard period, or a combination thereof, between the first subset of SRS transmissions and the second subset of SRS transmissions.

In some examples of the method, network entities, and non-transitory computer-readable medium described herein, the transmission scheme may be based on a presence or an absence of a guard period between the at least one SBFD symbol and the at least one non-SBFD symbol.

In some examples of the method, network entities, and non-transitory computer-readable medium described herein, a frequency resource for the first subset of SRS transmissions and the second subset of SRS transmissions may be wider than an uplink subband during the at least one SBFD symbol and may be within an uplink bandwidth during the at least one non-SBFD symbol and the transmission scheme may be based on the frequency resource.

Some examples of the method, network entities, and non-transitory computer-readable medium described herein may further include operations, features, means, or instructions for dropping reception of the first subset of SRS transmissions and the second subset of SRS transmissions according to the transmission scheme.

Some examples of the method, network entities, and non-transitory computer-readable medium described herein may further include operations, features, means, or instructions for dropping reception of the first subset of SRS transmissions and receiving the second subset of SRS transmissions according to the transmission scheme.

Some examples of the method, network entities, and non-transitory computer-readable medium described herein may further include operations, features, means, or instructions for receiving the first subset of SRS transmissions during the at least one SBFD symbol and the second subset of SRS transmissions during the at least one non-SBFD symbol according to a truncated SRS sequence, the truncated SRS sequence based on the transmission scheme.

Some examples of the method, network entities, and non-transitory computer-readable medium described herein may further include operations, features, means, or instructions for receiving the first subset of SRS transmissions during the at least one SBFD symbol and the second subset of SRS transmissions during the at least one non-SBFD symbol according to an updated SRS sequence, where a length of the updated SRS sequence may be based on the transmission scheme within an uplink subband frequency resource.

In some examples of the method, network entities, and non-transitory computer-readable medium described herein, the multi-symbol SRS transmissions include frequency hopping with a first hop of the frequency hopping including the first subset of SRS transmissions during the at least one SBFD symbol and a second hop of the frequency hopping including the second subset of SRS transmissions during the at least one non-SBFD symbol and the transmission scheme may be based on the frequency hopping.

Some examples of the method, network entities, and non-transitory computer-readable medium described herein may further include operations, features, means, or instructions for receiving the first subset of SRS transmissions and the second subset of SRS transmissions according to the transmission scheme.

Some examples of the method, network entities, and non-transitory computer-readable medium described herein may further include operations, features, means, or instructions for receiving or dropping reception of one or more instances of the second subset of SRS transmissions according to a presence or an absence of a guard period between the at least one SBFD symbol and the at least one non-SBFD symbol.

In some examples of the method, network entities, and non-transitory computer-readable medium described herein, the multi-symbol SRS transmissions include frequency hopping with a first hop of the frequency hopping including the first subset of SRS transmissions during the at least one SBFD symbol and a second hop of the frequency hopping including a first instance of the second subset of SRS transmissions during the at least one SBFD symbol and a second instance of the second subset of SRS transmissions during the at least one non-SBFD symbol and the transmission scheme may be based on the frequency hopping.

Some examples of the method, network entities, and non-transitory computer-readable medium described herein may further include operations, features, means, or instructions for receiving the first subset of SRS transmissions and the second subset of SRS transmissions according to the transmission scheme.

In some examples of the method, network entities, and non-transitory computer-readable medium described herein, the transmission scheme may be based on a phase continuity being maintained, a same set of transmission parameters being applied, a presence or an absence of a guard period, or a combination thereof, between the first subset of SRS transmissions and the second subset of SRS transmissions.

Some examples of the method, network entities, and non-transitory computer-readable medium described herein may further include operations, features, means, or instructions for receiving the first subset of SRS transmissions and dropping the first instance, the second instance, or both, of the second subset of SRS transmissions according to the transmission scheme.

A method for wireless communications by a network entity is described. The method may include transmitting, to a UE, an indication of resource parameters for performing SRS transmissions during a slot including at least one SBFD symbol, at least one non-SBFD symbol, and a gap period between the at least one SBFD symbol and the at least one non-SBFD symbol and receiving multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one SBFD symbol, in the at least one non-SBFD symbol, or both, of the slot and a location of a SRS guard period relative to a transition between the SBFD symbol and the non-SBFD symbol.

A network entity for wireless communications is described. The network entity may include one or more memories storing processor executable code, and one or more processors coupled (e.g., operatively, communicatively, functionally, electronically, or electrically) with the one or more memories. The one or more processors may individually or collectively operable to execute the code (e.g., directly, indirectly, after pre-processing, without pre-processing) to cause the network entity to transmit, to a UE, an indication of resource parameters for performing SRS transmissions during a slot including at least one SBFD symbol, at least one non-SBFD symbol, and a gap period between the at least one SBFD symbol and the at least one non-SBFD symbol and receive multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one SBFD symbol, in the at least one non-SBFD symbol, or both, of the slot and a location of a SRS guard period relative to a transition between the SBFD symbol and the non-SBFD symbol.

Another network entity for wireless communications is described. The network entity may include means for transmitting, to a UE, an indication of resource parameters for performing SRS transmissions during a slot including at least one SBFD symbol, at least one non-SBFD symbol, and a gap period between the at least one SBFD symbol and the at least one non-SBFD symbol and means for receiving multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one SBFD symbol, in the at least one non-SBFD symbol, or both, of the slot and a location of a SRS guard period relative to a transition between the SBFD symbol and the non-SBFD symbol.

A non-transitory computer-readable medium storing code for wireless communications is described. The code may include instructions executable by a processor (e.g., directly, indirectly, after pre-processing, without pre-processing) to transmit, to a UE, an indication of resource parameters for performing SRS transmissions during a slot including at least one SBFD symbol, at least one non-SBFD symbol, and a gap period between the at least one SBFD symbol and the at least one non-SBFD symbol and receive multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one SBFD symbol, in the at least one non-SBFD symbol, or both, of the slot and a location of a SRS guard period relative to a transition between the SBFD symbol and the non-SBFD symbol.

Some examples of the method, network entities, and non-transitory computer-readable medium described herein may further include operations, features, means, or instructions for receiving the first subset of SRS transmissions and the second subset of SRS transmissions and dropping reception of an SRS transmission scheduled during the gap period according to the transmission scheme.

Some examples of the method, network entities, and non-transitory computer-readable medium described herein may further include operations, features, means, or instructions for receiving the first subset of SRS transmissions and dropping reception of the second subset of SRS transmissions according to the transmission scheme.

DETAILED DESCRIPTION

Wireless networks may use subband full-duplex (SBFD) configuration where a given bandwidth, such as a downlink or uplink bandwidth, are divided into multiple subbands. The multiple subbands may include at least one downlink subband and at least one uplink subband. The SBFD techniques may be used during slot(s) where some symbols of the slot (e.g., the initial symbols) are allocated to a downlink bandwidth, some symbols of the slot (e.g., the final symbols) are allocated to an uplink bandwidth, and/or the remaining symbols of the slot being configured as SBFD symbols, e.g., the slots may include both SBFD and non-SBFD symbols. However, these techniques may create situations where repetition-based sounding reference signal (SRS) transmissions are scheduled in both the SBFD symbols and the non-SBFD symbols of the slot. Some wireless networks may not provide a mechanism or means for a user equipment (UE) to respond to such a scheduling.

Accordingly, aspects of the described techniques provide various mechanisms that support a UE performing or dropping SRS transmissions when the transmissions overlap the SBFD/non-SBFD boundary. For example, the UE may receive an indication of resource parameters. The resource parameters may identify resources and the associated parameters for the UE to perform the multi-symbol SRS transmissions during the mixed SBFD and non-SBFD symbols slot. The UE may perform the multi-symbol SRS transmissions according to a transmission scheme associated with the resource parameters. The transmission scheme may generally identify or otherwise define a transmit or drop rule applicable when the SRS transmissions span the SBFD and non-SBFD symbols.

Additionally, or alternatively, the UE may receive the resource parameters for the SRS transmissions when the SBFD and non-SBFD symbol slot includes a guard period. The UE may perform the multi-symbol SRS transmissions according to the transmission scheme. The transmission scheme in this example may be based on the mixture of SBFD and non-SBFD symbols along with the guard period. The UE may use the transition period (e.g., the guard period) or may drop the SRS transmissions after the transition period.

Aspects of the disclosure are initially described in the context of wireless communications systems. Aspects of the disclosure are further illustrated by and described with reference to apparatus diagrams, system diagrams, and flowcharts that relate to reference signal transmission in SBFD and non-SBFD slots.

Figure 1:
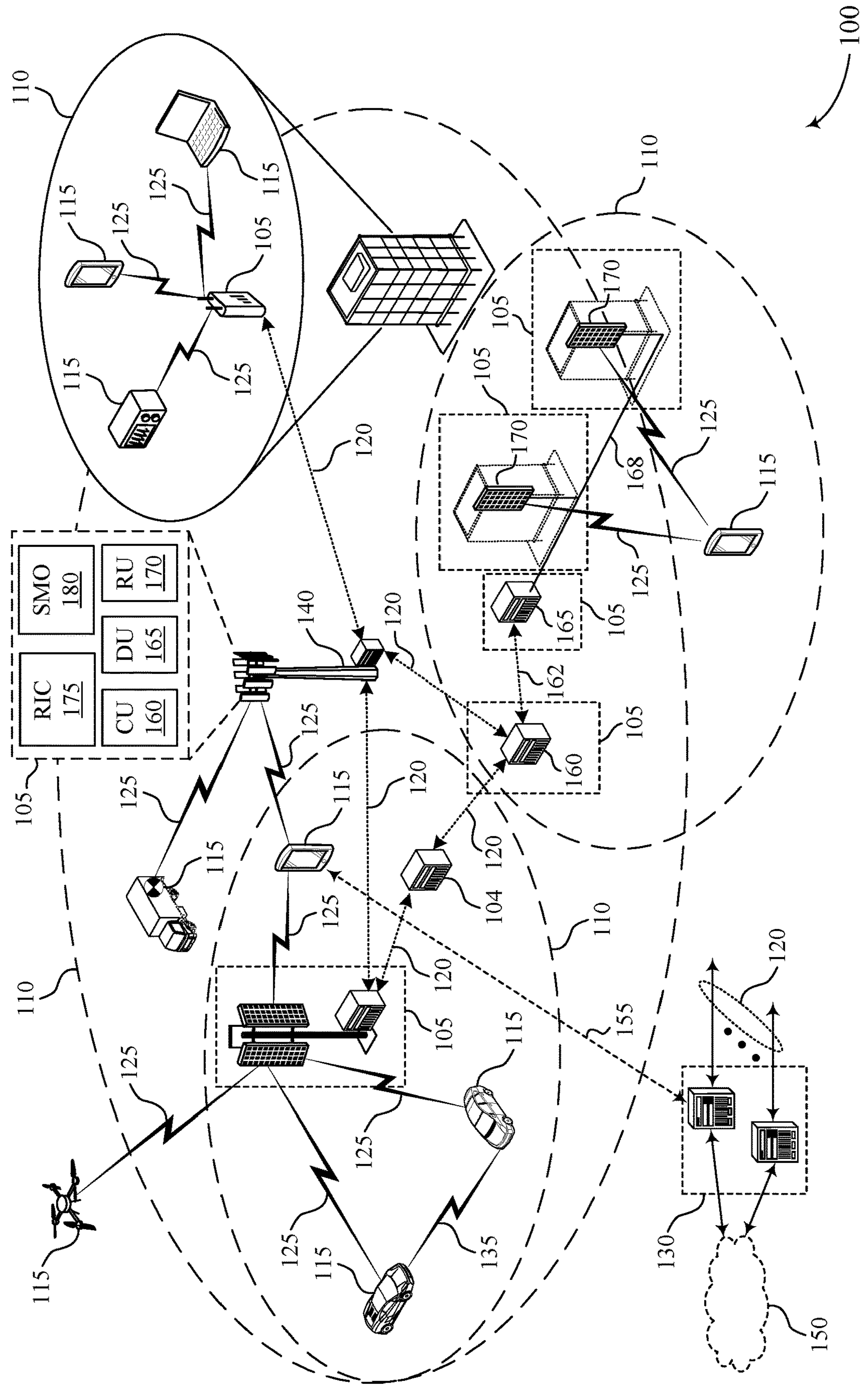
FIG. 1 shows an example of a wireless communications system that supports reference signal transmission in sub-band full-duplex (SBFD) and non-SBFD slots in accordance with one or more aspects of the present disclosure.

FIG. 1 shows an example of a wireless communications system 100 that supports reference signal transmission in SBFD and non-SBFD slots in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein. Components within a wireless communication system may be coupled (for example, operatively, communicatively, functionally, electronically, and/or electrically) to each other.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support reference signal transmission in SBFD and non-SBFD slots as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHZ.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A UE 115 may receive an indication of resource parameters for performing SRS transmissions during a slot comprising at least one SBFD symbol and at least one non-SBFD symbol. The UE 115 may perform multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one non-SBFD symbol of the slot.

A UE 115 may receive an indication of resource parameters for performing SRS transmissions during a slot comprising at least one SBFD symbol, at least one non-SBFD symbol, and a gap period between the at least one SBFD symbol and the at least one non-SBFD symbol. The UE 115 may perform multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one SBFD symbol, in the at least one non-SBFD symbol, or both, of the slot and a location of a SRS guard period relative to a transition between the SBFD symbol and the non-SBFD symbol.

A network entity 105 may transmit, to a UE 115, an indication of resource parameters for the UE 115 to perform SRS transmissions during a slot comprising at least one SBFD symbol and at least one non-SBFD symbol. The network entity 105 may receive multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one non-SBFD symbol of the slot.

A network entity 105 may transmit, to a UE 115, an indication of resource parameters for performing SRS transmissions during a slot comprising at least one SBFD symbol, at least one non-SBFD symbol, and a gap period between the at least one SBFD symbol and the at least one non-SBFD symbol. The network entity 105 may receive multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one SBFD symbol, in the at least one non-SBFD symbol, or both, of the slot and a location of a SRS guard period relative to a transition between the SBFD symbol and the non-SBFD symbol.

Figure 2:
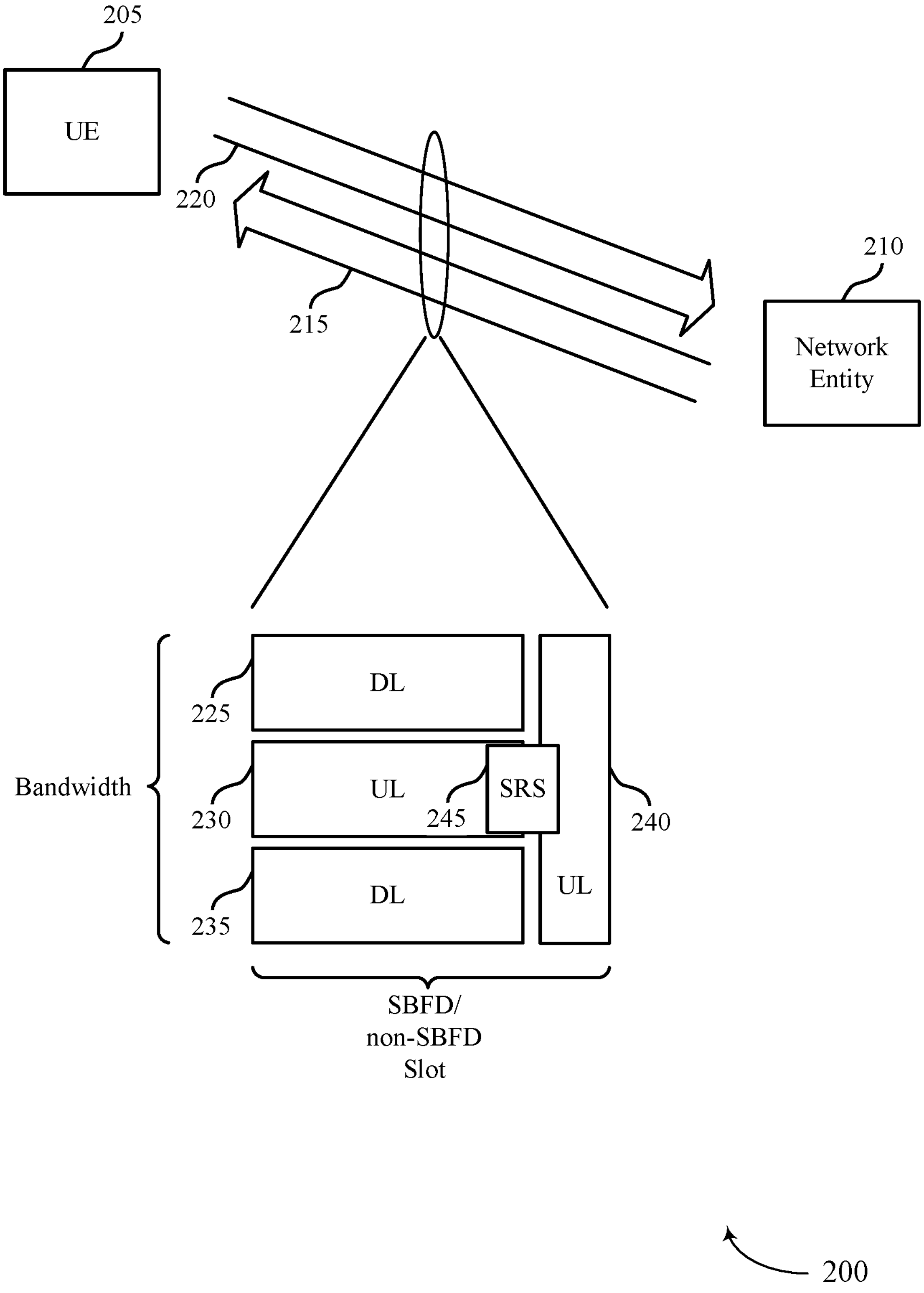
FIG. 2 shows an example of a wireless communications system that supports reference signal transmission in SBFD and non-SBFD slots in accordance with one or more aspects of the present disclosure.

FIG. 2 shows an example of a wireless communications system 200 that supports reference signal transmission in SBFD and non-SBFD slots in accordance with one or more aspects of the present disclosure. Wireless communications system 200 may implement aspects of wireless communications system 100. Wireless communications system 200 may include a UE 205 and/or a network entity 210, which may be examples of the corresponding devices described herein.

Wireless communications system 200 may support SBFD-based communication techniques. For example, during a slot some or all of a bandwidth associated with the UE 205 may be divided into multiple subbands. The SBFD slot may include at least one downlink subband and at least one uplink subband. In the non-limiting example illustrated in FIG. 2, the bandwidth is divided into a downlink subband 225, an uplink subband 230, and a downlink subband 235. In some examples, a portion of the symbols of the slot may include the full bandwidth being reserved or otherwise allocated to a downlink band and/or an uplink band (e.g., uplink band 240). When some of the symbols are allocated to the downlink band, these may include the initial 1-3 symbols that the UE 205 may use for monitoring a control channel (e.g., PDCCH). When some of the symbols are allocated to the uplink band 240, these may include the final 1-3 symbols that the UE 205 may use for transmitting uplink signals (e.g., uplink control information (UCI), HARQ-ACK feedback, and control information).

In some examples, the slot may be a mixed slot containing both SBFD symbols and non-SBFD symbols. In the non-limiting example shown in FIG. 2, the slot includes both SBFD symbols (e.g., symbols when the bandwidth is divided into the SBFD configuration) and non-SBFD symbols (e.g., symbols when the bandwidth is allocated to the uplink band 240). This may create a boundary within the slot between the SBFD symbols and the non-SBFD symbols, which may result in the UE 205 transitioning (or switching) from downlink communications within a downlink subband to uplink communications during uplink band 240. This may also result in the UE 205 transitioning from uplink communications within an uplink subband to uplink communications using the uplink band 240.

Wireless communications system 200 may support transmission/reception occasions for the UE 205 of a physical channel/signal that is mapped to SBFD and non-SBFD symbols within the slot. However, such techniques may create issues such as, but not limited to, phase continuity, guard time for the transitioning, uplink transmission timing, among others. For example, frequent switching between SBFD and non-SBFD symbols may increase implementation complexity and/or result in interruptions of the transmissions/receptions during the transition. In the example where the slot includes a downlink band (e.g., covering the full bandwidth) symbol(s), SBFD symbols, and the uplink band 240, this may create two transition points (or switching points) within the slot for the UE 205.

The wireless communications system 200 may support such transition points for the UE 205 within the slot containing both SBFD and non-SBFD symbols. For example, at 215 the network entity 210 may transmit or otherwise provide (and the UE 205 may receive or otherwise obtain) an indication of resource parameters. The resource parameters may be for the UE 205 to perform SRS transmissions (e.g., SRS 245) during the mixed SBFD/non-SBFD slot. In the slot containing both SBFD and non-SBFD symbols, this may result in the SRS resource (e.g., resources for SRS 245) being configured to overlap or to not overlap with subband/band frequency resources and/or outside or at the transition point. For example, the SRS resource may be scheduled such that some SRS transmission occasions are scheduled in SBFD symbols while other SRS transmission occasions are scheduled in non-SBFD symbols of the slot.

This situation may create an issue for the UE 205 scheduled with multi-symbol SRS transmissions during the mixed SBFD symbol/non-SBFD symbol slot. One option may include the UE 205 not transmitting or receiving a physical channel/signal during the mixed slot. However, this option may increase latency and be resource inefficient. Another option may include the UE 205 transmitting or receiving the physical channel/signal (e.g., SRS) during the mixed slot. Some wireless networks may not support scheduling the UE 205 with multi-symbol SRS transmissions during the mixed slot.

However, aspects of the techniques described herein provide various mechanisms to support such UE 205 behavior when the UE 205 is scheduled with SRS transmissions during the mixed slot. Aspects of the described techniques may include a transmission scheme applied by the UE 205 and/or the network entity 210 when scheduling multi-symbol SRS transmissions in the mixed slot where the SRS transmissions overlap with the transition boundary. The transmission scheme may be based on certain features, such as whether or not phase continuity can be maintained across the SBFD and non-SBFD symbols, uplink timing applied in the SBFD and non-SBFD symbols, a presence or an absence of a guard period between the SBFD and non-SBFD symbols, and other considerations.

The transmission scheme described herein generally provides a transmit or drop rule to be applied by the UE 205 when the multi-symbol SRS transmissions are scheduled in both (e.g., span both) the SBFD symbol(s) and the non-SBFD symbol(s). That is, the transmission scheme generally provides guidance for the UE 205 and/or the network entity 210 to follow when SRS transmissions are scheduled in the mixed SBFD/non-SBFD symbol containing slot. At 220, the UE 205 may transmit, perform, or otherwise provide (and the network entity 210 may receive or otherwise obtain) the multi-symbol SRS transmissions (e.g., SRS 245) according to the transmissions scheme.

In some examples, the transmission scheme may define a transmit rule where the UE 205 performs the SRS transmissions during the SBFD symbols, during the non-SBFD symbols, or during both SBFD and non-SBFD symbols. In some examples, the transmission scheme may define a drop rule where the UE 205 does not perform the SRS transmission due to the multi-symbol SRS transmissions overlapping the transition point. The transmission scheme may be based on the frequency resources associated with the multi-symbol SRS transmissions (e.g., whether the frequency resources are within a subband or within a band). The transmission scheme may be based on the timing of the SRS transmissions (e.g., whether the time resources of the SRS overlap with the transition point between SBFD symbols and non-SBFD symbols.

As is discussed in greater detail below, the transmission scheme may be applied by the UE 205 and/or the network entity 210 when the UE 205 is schedule to perform multi-symbol SRS transmissions during mixed SBFD symbol and non-SBFD symbol slots.

Figure 3A:
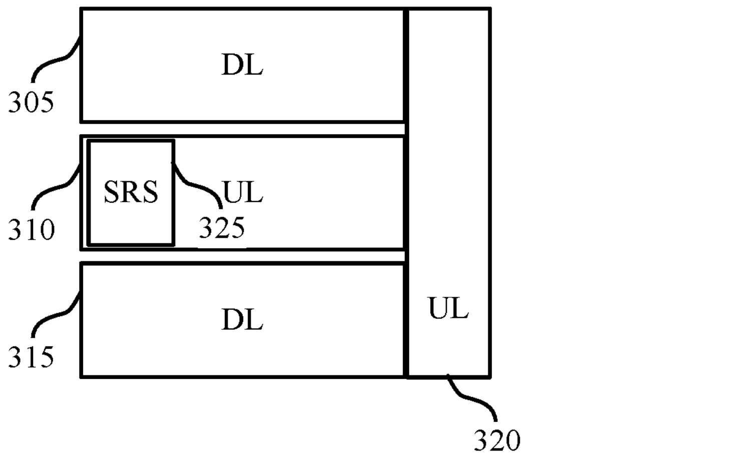
FIGS. 3A and 3B show examples of a transmission scheme that supports reference signal transmission in SBFD and non-SBFD slots in accordance with one or more aspects of the present disclosure.
Figure 3B:
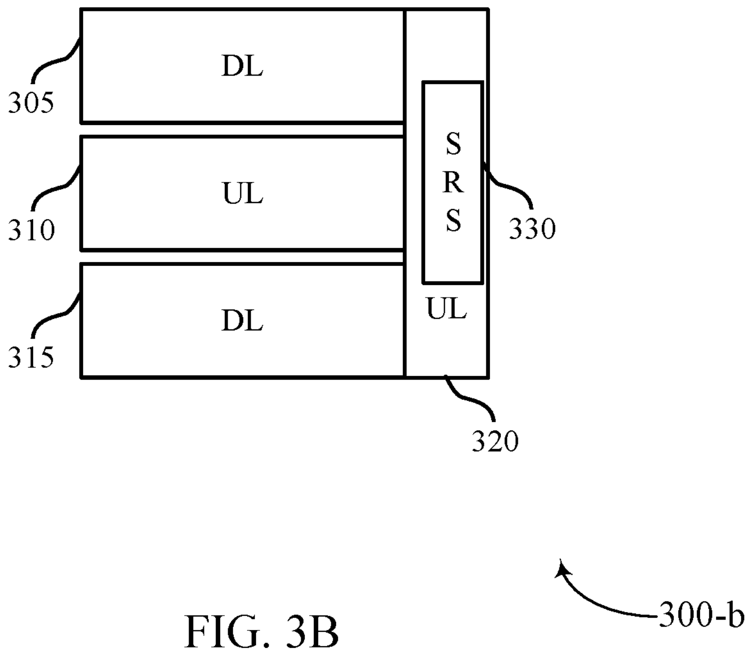

FIGS. 3A and 3B show examples of a transmission scheme 300 that supports reference signal transmission in SBFD and non-SBFD slots in accordance with one or more aspects of the present disclosure. Transmission scheme 300 may implement or be implemented by wireless communications system 100 and/or wireless communications system 200. Aspects of transmission scheme 300 may be implemented at or implemented by a UE and/or network entity, which may be examples of the corresponding devices described herein.

Transmission scheme 300-*a* of FIG. 3A illustrates a non-limiting example of a mixed SBFD and non-SBFD symbol slot where multi-symbol SRS transmissions are scheduled within an uplink subband during the SBFD symbol(s). Transmission scheme 300-*b* of FIG. 3B illustrates a non-limiting example of a mixed SBFD and non-SBFD symbol slot where multi-symbol SRS transmissions are scheduled within an uplink band during the non-SBFD symbol(s).

Aspects of the techniques described herein provide for a transmission scheme to be applied by the UE. The transmission scheme may generally define a transmit or drop rule for SRS transmissions scheduled during slots having both SBFD symbols and non-SBFD symbols. For example, the network entity may transmit, provide, or otherwise convey an indication of resource parameters for the UE to use for performing SRS transmissions during the SBFD/non-SBFD symbol slot. The network entity may provide the indication via RRC signaling, medium access control-control element (MAC-CE) signaling, and/or via other signaling.

The resource parameters may generally identify or otherwise provide the time resources, frequency resources, spatial resources, code resources, and/or other parameters used by the UE to perform the SRS transmissions. The resource parameters may configure the SRS transmissions as multi-symbol SRS transmissions. The multi-symbol SRS transmissions may include the UE transmitting multiple repetitions of the SRS transmission in different symbols. For example, the UE may transmit multiple SRS(s) in different frequency resources and/or in different time resources. That is, the multi-symbol SRS transmissions may include SRS transmissions in a subset of (e.g., one or more) resource elements (REs) during multiple symbols of the slot.

Transmission scheme 300 illustrates a slot containing both SBFD symbols and non-SBFD symbols (e.g., a mixed slot or a SBFD/non-SBFD slot). That is, the slot may have an associated bandwidth (e.g., a downlink bandwidth or BWP and/or an uplink bandwidth or BWP). The slot may include one or more SBFD symbols during which the frequency resources of the bandwidth are divided into downlink subband(s) and uplink subband(s). In the non-limiting example shown, this may include the bandwidth associated with the UE being divided into a downlink subband 305, an uplink subband 310, and a downlink subband 315, during the SBFD symbols. However, it is to be understood that the bandwidth may be divided into other mixtures of downlink and uplink subbands during the SBFD symbols.

The slot may include one or more non-SBFD symbols during which the frequency resources of the bandwidth are allocated to either downlink communications (e.g., a downlink band) or uplink communications (e.g., an uplink band). In the non-limiting example shown, this may include the bandwidth associated with the UE being allocated to uplink band 320, during the non-SBFD symbols. However, it is to be understood that the bandwidth may be allocated to a downlink band in some examples. In some examples, the slot may include an initial subset of symbols (e.g., one or more) where the bandwidth is allocated to a downlink band, a final subset of symbols (e.g., one or more) where the bandwidth is allocated to an uplink band, and an intermediate subset of symbols where the bandwidth is divided into uplink and downlink subbands.

The resource parameters may configure the UE to perform multi-symbol SRS transmissions. As illustrated by way of non-limiting example, the resource parameters for the multi-symbol SRS configure the transmissions during a slot that includes both SBFD symbols and non-SBFD symbols.

Turning first to transmission scheme 300-*a* of FIG. 3A, the transmission scheme may generally define a transmit or drop rule based on the frequency resources and/or time resources associated with SRS 325. In this non-limiting example, the SRS 325 may be scheduled (e.g., based on the resource parameters) with frequency resources within (e.g., fully overlapping) the uplink subband 310 as well as with time resources during only the SBFD symbols. In this example, the transmission scheme may define that the UE performs the transmissions of SRS 325 according to the resource parameters (e.g., a transmit rule). Accordingly, the UE may transmit SRS 325 during the SBFD symbols of the mixed slot.

Turning next to transmission scheme 300-*b* of FIG. 3B, the transmission scheme may generally define a transmit or drop rule based on the frequency resources and/or time resources associated with SRS 330. In this non-limiting example, the SRS 330 may be scheduled (e.g., based on the resource parameters) with frequency resources within the uplink band 320 as well as with time resources during only the non-SBFD symbols. In this example, the transmission scheme may define that the UE performs the transmissions of SRS 330 according to the resource parameters (e.g., a transmit rule). Accordingly, the UE may transmit SRS 330 during the non-SBFD symbols of the mixed slot.

Accordingly, transmission scheme 300 illustrates non-limiting examples of, when an SRS resource occurs in a slot with both SBFD and non-SBFD symbols, the time locations of the SRS resource (e.g., resource parameters) mays to only SBFD symbols or only to non-SBFD symbols, the SRS is transmitted (e.g., not dropped). In some aspects, transmission of the SRS according to the transmission scheme may also be based on whether the transmission collides with another transmission having a higher priority signal or channel. For example, collision with a higher priority signal or channel may result in the UE dropping the SRS transmissions. In some aspects, the SRS resources discussed herein may include persistent and/or semi-persistent resource(s) of an SRS set and/or may include aperiodic SRS resources scheduled in the slot.

Figure 4A:
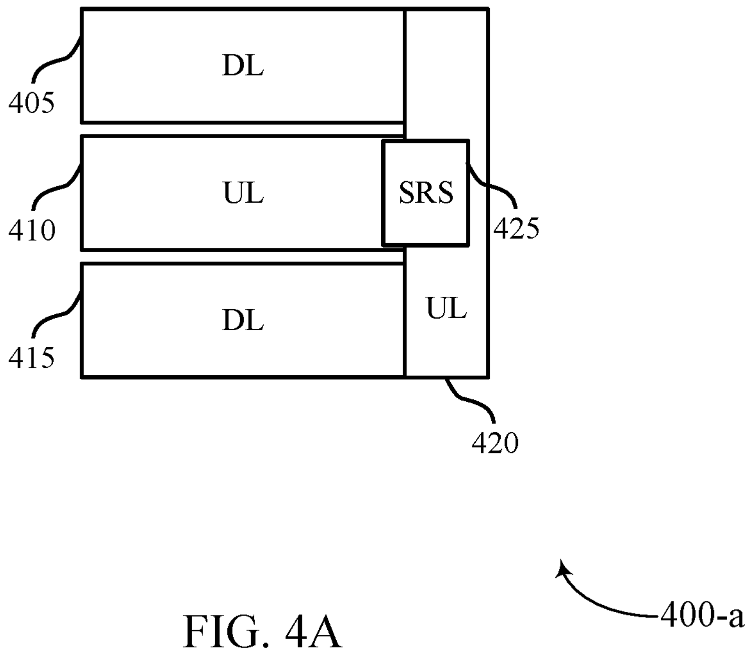
FIGS. 4A and 4B show examples of a transmission scheme that supports reference signal transmission in SBFD and non-SBFD slots in accordance with one or more aspects of the present disclosure.
Figure 4B:
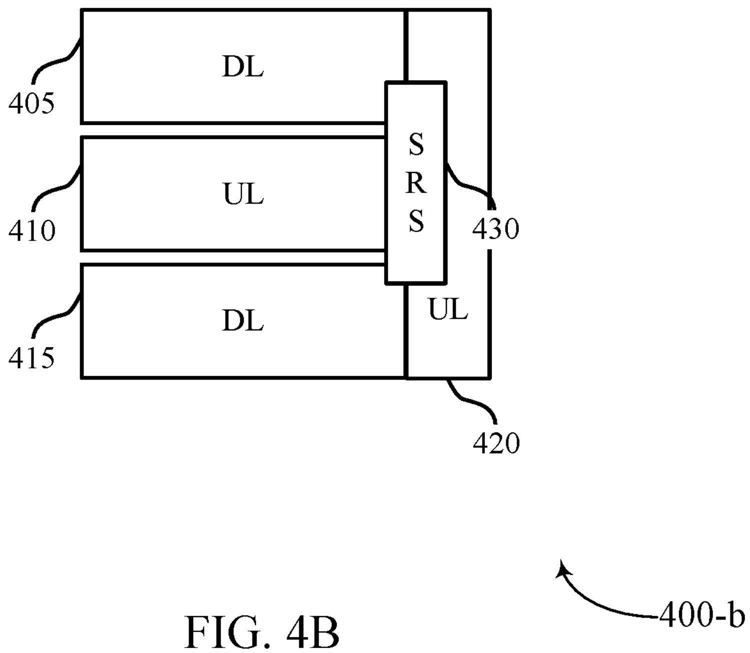

FIGS. 4A and 4B show examples of a transmission scheme 400 that supports reference signal transmission in SBFD and non-SBFD slots in accordance with one or more aspects of the present disclosure. Transmission scheme 400 may implement or be implemented by wireless communications system 100 and/or wireless communications system 200 and/or aspects of transmission scheme 300. Aspects of transmission scheme 400 may be implemented at or implemented by a UE and/or network entity, which may be examples of the corresponding devices described herein.

Transmission scheme 400-*a* of FIG. 4A illustrates a non-limiting example of a mixed SBFD and non-SBFD symbol slot where multi-symbol SRS transmissions are scheduled within an uplink subband during both the SBFD symbol(s) and the non-SBFD symbols. Transmission scheme 400-*b* of FIG. 4B illustrates a non-limiting example of a mixed SBFD and non-SBFD symbol slot where multi-symbol SRS transmissions are scheduled within an uplink band during both the SBFD symbol(s) and the non-SBFD symbol(s).

Aspects of the techniques described herein provide for a transmission scheme to be applied by the UE. The transmission scheme may generally define a transmit or drop rule for SRS transmissions scheduled during slots having both SBFD symbols and non-SBFD symbols. For example, the network entity may transmit, provide, or otherwise convey an indication of resource parameters for the UE to use for performing SRS transmissions during the SBFD/non-SBFD symbol slot. The network entity may provide the indication via RRC signaling, MAC-CE signaling, and/or via other signaling.

The resource parameters may generally identify or otherwise provide the time resources, frequency resources, spatial resources, code resources, and/or other parameters used by the UE to perform the SRS transmissions. The resource parameters may configure the SRS transmissions as multi-symbol SRS transmissions. The multi-symbol SRS transmissions may include the UE transmitting multiple SRS transmission. For example, the UE may transmit multiple SRSs in different frequency resources and/or in different time resources. That is, the multi-symbol SRS transmissions may include SRS transmissions in a subset of (e.g., one or more) REs during multiple symbols of the slot.

Transmission scheme 400 illustrates a slot containing both SBFD symbols and non-SBFD symbols (e.g., a mixed slot or a SBFD/non-SBFD slot). That is, the slot may have an associated bandwidth (e.g., a downlink bandwidth or BWP and/or an uplink bandwidth or BWP). The slot may include one or more SBFD symbols during which the frequency resources of the bandwidth are divided into downlink subband(s) and uplink subband(s). In the non-limiting example shown, this may include the bandwidth associated with the UE being divided into a downlink subband 405, an uplink subband 410, and a downlink subband 415, during the SBFD symbols. However, it is to be understood that the bandwidth may be divided into other mixtures of downlink and uplink subbands during the SBFD symbols.

The slot may include one or more non-SBFD symbols during which the frequency resources of the bandwidth are allocated to either downlink communications (e.g., a downlink band) or uplink communications (e.g., an uplink band). In the non-limiting example shown, this may include the bandwidth associated with the UE being allocated to uplink band 420, during the non-SBFD symbols. However, it is to be understood that the bandwidth may be allocated to a downlink band in some examples. In some examples, the slot may include an initial subset of symbols (e.g., one or more) where the bandwidth is allocated to a downlink band, a final subset of symbols (e.g., one or more) where the bandwidth is allocated to an uplink band, and an intermediate subset of symbols where the bandwidth is divided into uplink and downlink subbands.

The resource parameters may configure the UE to perform multi-symbol SRS transmissions. As illustrated by way of non-limiting example, the resource parameters for the multi-symbol SRS configure the transmissions during a slot that includes both SBFD symbols and non-SBFD symbols. The multi-symbol SRS transmissions may include a first subset of the SRS transmissions being scheduled during SBFD symbols and a second subset of the SRS transmissions being scheduled during non-SBFD symbols.

Turning first to transmission scheme 400-*a* of FIG. 4A, the transmission scheme may generally define a transmit or drop rule based on the frequency resources and/or time resources associated with SRS 425. Transmission scheme 400-*a* illustrates a non-limiting example where the frequency resource for a first subset of SRS transmissions and the second subset of SRS transmissions are within an uplink subband during at least one SBFD symbol and during at least one non-SBFD symbol. Transmission scheme 400-*a* may be based on the frequency resource. That is, in this non-limiting example the SRS 425 may be scheduled (e.g., based on the resource parameters) with frequency resources within (e.g., fully overlapping) the uplink subband 410 as well as with time resources during both the SBFD symbols and the non-SBFD symbol(s). In this example, various examples of the transmission scheme may be applied by the UE when the multi-symbol SRS transmissions are scheduled within an uplink subband in the frequency domain and during both SBFD symbol(s) and non-SBFD symbol(s) in the time domain.

One example of a transmission scheme may include a drop rule where the UE simply drops transmission (e.g., does not transmit or otherwise perform) of SRS 425. In this example where an SRS resource occurs in a slot with SBFD and non-SBFD symbols, where the time locations of the SRS resources maps to both SBFD and non-SBFD symbols, and where the frequency resources of the SRS 425 are within an uplink subband, the transmission scheme may include the UE dropping the transmission of first subset of SRS transmissions during the SBFD symbols and dropping the second subset of SRS transmissions during the non-SBFD symbols.

Another example of a transmission scheme may include a drop rule where the UE simply drops transmission (e.g., does not transmit or otherwise perform) of part of SRS 425. In this example where an SRS resource occurs in a slot with SBFD and non-SBFD symbols, where the time locations of the SRS resources maps to both SBFD and non-SBFD symbols, and where the frequency resources of the SRS 425 are within an uplink subband, the transmission scheme may include the UE dropping the transmission of first subset of SRS transmissions during the SBFD symbols and performing the second subset of SRS transmissions during the non-SBFD symbols, or vice versa. That is, the UE may drop the first subset of SRS transmissions (e.g., those during the SBFD symbols) and perform the second subset of SRS transmissions (e.g., those during the non-SBFD symbols) according to the transmission scheme. Alternatively, the UE may perform the first subset of SRS transmissions and drop the second subset of SRS transmissions. In this example, the transmission scheme may be considered a partial drop rule in that only some of the SRS transmissions are dropped when SRS transmissions span both SBFD and non-SBFD slots.

Another example of a transmission scheme may include a transmit rule where the UE performs the multi-symbol SRS transmissions. In this example where an SRS resource occurs in a slot with SBFD and non-SBFD symbols, where the time locations of the SRS resources maps to both SBFD and non-SBFD symbols, and where the frequency resources of the SRS 425 are within an uplink subband, the transmission scheme may include the UE performing the transmission of both the first subset of SRS transmissions during the SBFD symbols and performing the second subset of SRS transmissions during the non-SBFD symbols.

In some aspects, the example transmission scheme defining the transmit rule may be based on some conditions being satisfied (e.g., QCL relationship(s), channel coherency, phase continuity, transmission parameters, power control, and others). That is, the UE may apply the transmission scheme and transmit SRS 425 when such conditions are satisfied or otherwise met. For example, the conditions may be based on a presence or absence of a guard period between the SBFD symbol(s) and non-SBFD symbol(s).

The guard period may generally include one or more symbol(s) being reserved between the SBFD symbols and the non-SBFD symbols. The guard period may allow the UE to implement procedures associated with transitioning from subband-based communications to full bandwidth-based communications, to retune from downlink communications to uplink communications, as well as other operations. The transmission scheme to be applied in this example may include the UE dropping at least the SRS transmission(s) mapped to the guard period. Additionally, or alternatively, the UE may drop all SRS transmissions mapped to the guard period or scheduled after the guard period. In this example, the UE may perform the first subset of SRS transmissions and drop the second subset of SRS transmissions (as well as SRS transmissions scheduled during the guard period) based on the guard period being present.

Turning next to transmission scheme 400-*b* of FIG. 4B, the transmission scheme may generally define a transmit or drop rule based on the frequency resources and/or time resources associated with SRS 430. Transmission scheme 400-*b* illustrates a non-limiting example a frequency resource for the first subset of SRS transmissions and the second subset of SRS transmissions is wider than an uplink subband during the at least one SBFD and is within an uplink bandwidth (e.g., uplink band 420) during the at least one non-SBFD symbol. Transmission scheme 400-*b* may be based on the frequency resource. That is, in this non-limiting example the SRS 430 may be scheduled (e.g., based on the resource parameters) with frequency resources wider than the uplink subband 410 as well as with time resources during both the SBFD symbols and the non-SBFD symbol(s). The frequency resources may be within the uplink band 420. In this example, various examples of the transmission scheme may be applied by the UE when the multi-symbol SRS transmissions are scheduled within an uplink band 420, but wider than the uplink subband 410, in the frequency domain and during both SBFD symbol(s) and non-SBFD symbol(s) in the time domain.

One example of a transmission scheme may include a drop rule where the UE simply drops transmission (e.g., does not transmit or otherwise perform) of SRS 430. In this example where an SRS resource occurs in a slot with SBFD and non-SBFD symbols, where the time locations of the SRS resources maps to both SBFD and non-SBFD symbols, and where the frequency resources of the SRS 430 are within an uplink band 420 (e.g. collides with the uplink subband 410), the transmission scheme may include the UE dropping the transmission of the first subset of SRS transmissions during the SBFD symbols and dropping the second subset of SRS transmissions during the non-SBFD symbols.

Another example of a transmission scheme may include a drop rule where the UE simply drops transmission (e.g., does not transmit or otherwise perform) of part of SRS 430. In this example where an SRS resource occurs in a slot with SBFD and non-SBFD symbols, where the time locations of the SRS resources maps to both SBFD and non-SBFD symbols, and where the frequency resources of the SRS 430 are within the uplink band 420, the transmission scheme may include the UE dropping the transmission of first subset of SRS transmissions during the SBFD symbols and performing the second subset of SRS transmissions during the non-SBFD symbols. That is, the UE may drop the first subset of SRS transmissions (e.g., those during the SBFD symbols) and perform the second subset of SRS transmissions (e.g., those during the non-SBFD symbols) according to the transmission scheme.

Another example of a transmission scheme may include a transmit rule where the UE performs the multi-symbol SRS transmissions. In this example where an SRS resource occurs in a slot with SBFD and non-SBFD symbols, where the time locations of the SRS resources maps to both SBFD and non-SBFD symbols, and where the frequency resources of the SRS 430 collide with (e.g., are wider than) the uplink subband 410, the transmission scheme may include the UE performing the transmission of both the first subset of SRS transmissions during the SBFD symbols and performing the second subset of SRS transmissions during the non-SBFD symbols. In some examples, this transmit rule may be based on the UE truncating the SRS sequence. That is, the UE may truncate the SRS sequence used for the transmission of SRS 430 such that the frequency resources of the SRS 430 are limited to within the uplink subband 410. For example, the truncated SRS sequence may include the UE performing the transmission of SRS 430, but using the truncated sequence where a reduced number of ports are used for the SRS transmission, a shortened sequence identifier associated with the SRS, the number of REs allocated to the SRS transmission are truncated, or other mechanisms to reduce the frequency resources of SRS 430 to fit within the uplink subband 410.

Another example of a transmission scheme may include a transmit rule where the UE performs the multi-symbol SRS transmissions. In this example where an SRS resource occurs in a slot with SBFD and non-SBFD symbols, where the time locations of the SRS resources maps to both SBFD and non-SBFD symbols, and where the frequency resources of the SRS 430 collide with (e.g., are wider than) the uplink subband 410, the transmission scheme may include the UE performing the transmission of both the first subset of SRS transmissions during the SBFD symbols and performing the second subset of SRS transmissions during the non-SBFD symbols. In some examples, this transmit rule may be based on the UE updating the SRS sequence (e.g., a new SRS sequence is generated based on the frequency resources in the uplink subband). That is, the UE may use or otherwise generate a new or updated SRS sequence used for the transmission of SRS 430 such that the frequency resources of the SRS 430 are limited to within the uplink subband 410. In some aspects, the length of the updated SRS sequence may be based on the transmission scheme within the uplink subband frequency resource(s).

Figure 5A:
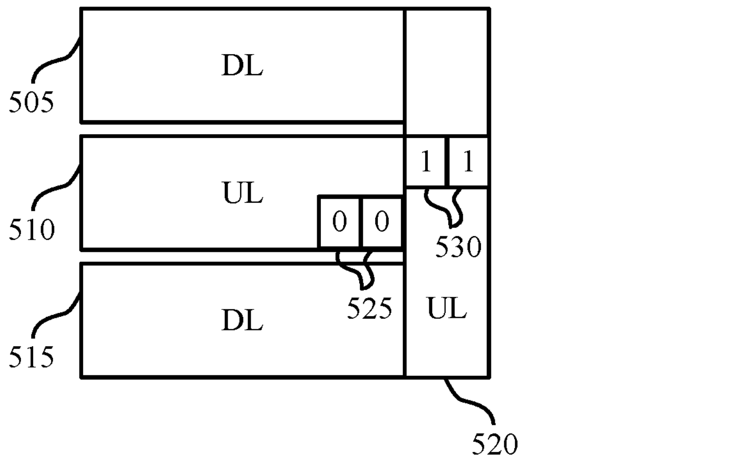
FIGS. 5A and 5B show examples of a transmission scheme that supports reference signal transmission in SBFD and non-SBFD slots in accordance with one or more aspects of the present disclosure.
Figure 5B:
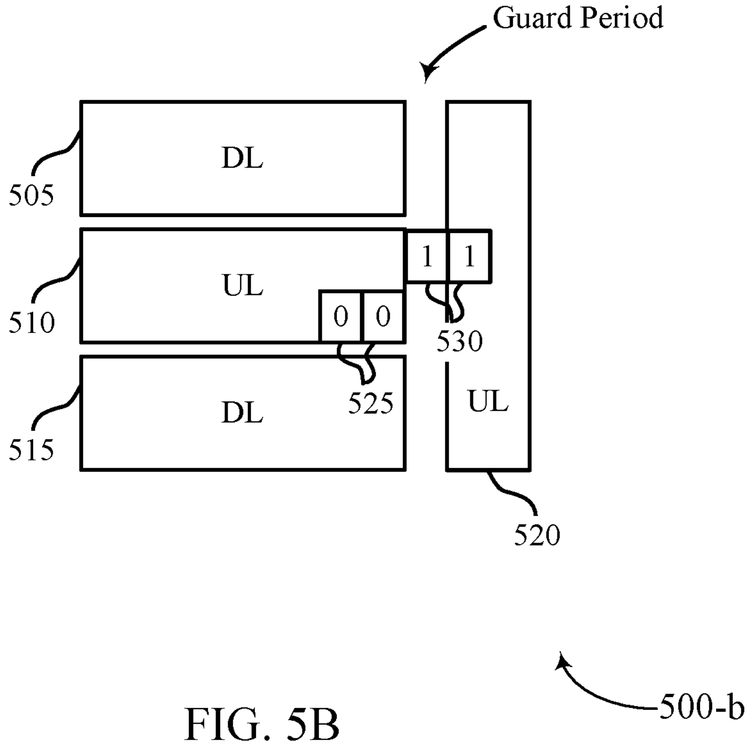

FIGS. 5A and 5B show examples of a transmission scheme 500 that supports reference signal transmission in SBFD and non-SBFD slots in accordance with one or more aspects of the present disclosure. Transmission scheme 500 may implement or be implemented by wireless communications system 100 and/or wireless communications system 200 and/or aspects of transmission schemes 300 and/or 400. Aspects of transmission scheme 500 may be implemented at or implemented by a UE and/or network entity, which may be examples of the corresponding devices described herein.

Transmission scheme 500-*a* of FIG. 5A illustrates a non-limiting example of a mixed SBFD and non-SBFD symbol slot where multi-symbol SRS transmissions are scheduled with frequency hopping and within an uplink subband during both the SBFD symbol(s) and the non-SBFD symbols. Transmission scheme 500-*b* of FIG. 5B illustrates a non-limiting example of a mixed SBFD and non-SBFD symbol slot where multi-symbol SRS transmissions are scheduled with frequency hopping and within an uplink subband during both the SBFD symbol(s) and the non-SBFD symbol(s) that are separated by a guard period.

Aspects of the techniques described herein provide for a transmission scheme to be applied by the UE. The transmission scheme may generally define a transmit or drop rule for SRS transmissions scheduled during slots having both SBFD symbols and non-SBFD symbols. For example, the network entity may transmit, provide, or otherwise convey an indication of resource parameters for the UE to use for performing SRS transmissions during the SBFD/non-SBFD symbol slot. The network entity may provide the indication via RRC signaling, MAC-CE signaling, and/or via other signaling.

The resource parameters may generally identify or otherwise provide the time resources, frequency resources, spatial resources, code resources, and/or other parameters used by the UE to perform the SRS transmissions. The resource parameters may configure the SRS transmissions as multi-symbol SRS transmissions. The multi-symbol SRS transmissions may include the UE transmitting multiple repetitions of the SRS transmission. For example, the UE may transmit multiple repetitions in different frequency resources and/or in different time resources. That is, the multi-symbol SRS transmissions may include SRS transmissions in a subset of (e.g., one or more) REs during multiple symbols of the slot.

The resource parameters may identify or otherwise configure the SRS transmissions with frequency hopping. In the non-limiting example shown, this may include a first subset of SRS transmissions (e.g., SRS 525) being scheduled in a first hop using frequency resources '0' and a second subset of SRS transmissions (e.g., SRS 530) being scheduled in a second hop using frequency resources '1.' That is, the multi-symbol SRS transmissions may use frequency hopping with a first hop of the frequency hopping including the first subset of SRS transmissions during the at least one SBFD symbol and a second hop of the frequency hopping including the second subset of SRS transmissions during the at least one non-SBFD symbol. In this example, the transmission scheme may be based on the frequency hopping.

Transmission scheme 500 illustrates a slot containing both SBFD symbols and non-SBFD symbols (e.g., a mixed slot or a SBFD/non-SBFD slot). That is, the slot may have an associated bandwidth (e.g., a downlink bandwidth or BWP and/or an uplink bandwidth or BWP). The slot may include one or more SBFD symbols during which the frequency resources of the bandwidth are divided into downlink subband(s) and uplink subband(s). In the non-limiting example shown, this may include the bandwidth associated with the UE being divided into a downlink subband 505, an uplink subband 510, and a downlink subband 515, during the SBFD symbols. However, it is to be understood that the bandwidth may be divided into other mixtures of downlink and uplink subbands during the SBFD symbols.

The slot may include one or more non-SBFD symbols during which the frequency resources of the bandwidth are allocated to either downlink communications (e.g., a downlink band) or uplink communications (e.g., an uplink band). In the non-limiting example shown, this may include the bandwidth associated with the UE being allocated to uplink band 520 during the non-SBFD symbols. However, it is to be understood that the bandwidth may be allocated to a downlink band in some examples. In some examples, the slot may include an initial subset of symbols (e.g., one or more) where the bandwidth is allocated to a downlink band, a final subset of symbols (e.g., one or more) where the bandwidth is allocated to an uplink band, and an intermediate subset of symbols where the bandwidth is divided into uplink and downlink subbands.

The resource parameters may configure the UE to perform multi-symbol SRS transmissions with frequency hopping. As illustrated by way of non-limiting example, the resource parameters for the multi-symbol SRS configure the transmissions with frequency hopping during a slot that includes both SBFD symbols and non-SBFD symbols. The multi-symbol SRS transmissions may include a first subset of the SRS transmissions in a first hop being scheduled during SBFD symbols and a second subset of the SRS transmissions in a second hop being scheduled during non-SBFD symbols.

Turning first to transmission scheme 500-*a* of FIG. 5A, the transmission scheme may generally define a transmit or drop rule based on the frequency resources and/or time resources associated with SRS transmissions, as well as the frequency hopping. Transmission scheme 500-*a* illustrates a non-limiting example where the frequency resource for a first subset of SRS transmissions in the first hop and the second subset of SRS transmissions in the second hop are within an uplink subband during at least one SBFD symbol and during at least one non-SBFD symbol. Transmission scheme 500-*a* may be based on the frequency resource and the frequency hopping. That is, in this non-limiting example the SRS transmissions may be scheduled (e.g., based on the resource parameters) with frequency resources within (e.g., fully overlapping) the uplink subband 510 as well as with time resources during both the SBFD symbols and the non-SBFD symbol(s). In this example, various examples of the transmission scheme may be applied by the UE when the multi-symbol SRS transmissions are scheduled with frequency hopping within an uplink subband in the frequency domain and during both SBFD symbol(s) and non-SBFD symbol(s) in the time domain.

One example of a transmission scheme may include a transmit rule where the UE performs transmission (e.g., transmits) the multi-symbol SRS transmissions with frequency hopping. In this example where an SRS resource occurs in a slot with SBFD and non-SBFD symbols, where the time locations of the SRS resources maps to both SBFD and non-SBFD symbols, and where the SRS resource is configured with frequency hopping and the frequency hops are either contained in SBFD symbols or the non-SBFD symbols, the transmission scheme may include the UE transmitting the first subset of SRS transmissions during the SBFD symbols and the second subset of SRS transmissions during the non-SBFD symbols. That is, the UE may transmit SRS 525 (e.g., two repetitions/instances using frequency resources ‘0’) during the SBFD symbols and transmit SRS 530 (e.g., two repetitions/instances using frequency resources ‘1’) during the non-SBFD symbols.

Turning next to transmission scheme 500-*b* of FIG. 5B, the transmission scheme may generally define a transmit or drop rule based on the frequency resources and/or time resources associated with SRS transmissions, as well as the frequency hopping. Transmission scheme 500-*b* illustrates a non-limiting example where the frequency resource for a first subset of SRS transmissions in the first hop and the second subset of SRS transmissions in the second hop are within an uplink subband during at least one SBFD symbol and during at least one non-SBFD symbol. In the non-limiting example shown, the resource parameters may further include a guard period scheduled between the SBFD symbols and the non-SBFD symbols. Transmission scheme 500-*b* may be based on the frequency resource, the frequency hopping, and the presence of the guard period.

That is, in this non-limiting example the SRS transmissions may be scheduled (e.g., based on the resource parameters) with frequency resources within (e.g., fully overlapping) the uplink subband 510 as well as with time resources during both the SBFD symbols and the non-SBFD symbol(s). In this example, various examples of the transmission scheme may be applied by the UE when the multi-symbol SRS transmissions are scheduled with frequency hopping within an uplink subband in the frequency domain and during both SBFD symbol(s) and non-SBFD symbol(s) in the time domain, as well as the guard period.

That is, the transmission scheme may be based on the presence or absence of a guard period scheduled between the SBFD and non-SBFD symbols. The guard period may generally include one or more symbol(s) being reserved between the SBFD symbols and the non-SBFD symbols. The guard period may allow the UE to implement procedures associated with transitioning from subband-based communications to full bandwidth-based communications, to retune from downlink communications to uplink communications, as well as other operations. The transmission scheme to be applied in this example may include the UE either performing or dropping at least the SRS transmission(s) mapped to the guard period. Additionally, or alternatively, the UE may drop all SRS transmissions mapped to the guard period or scheduled after the guard period. In this example, the UE may perform the first subset of SRS transmissions and drop none, some, or all of the second subset of SRS transmissions (as well as SRS transmissions scheduled during the guard period) based on the guard period being present.

Figure 6A:
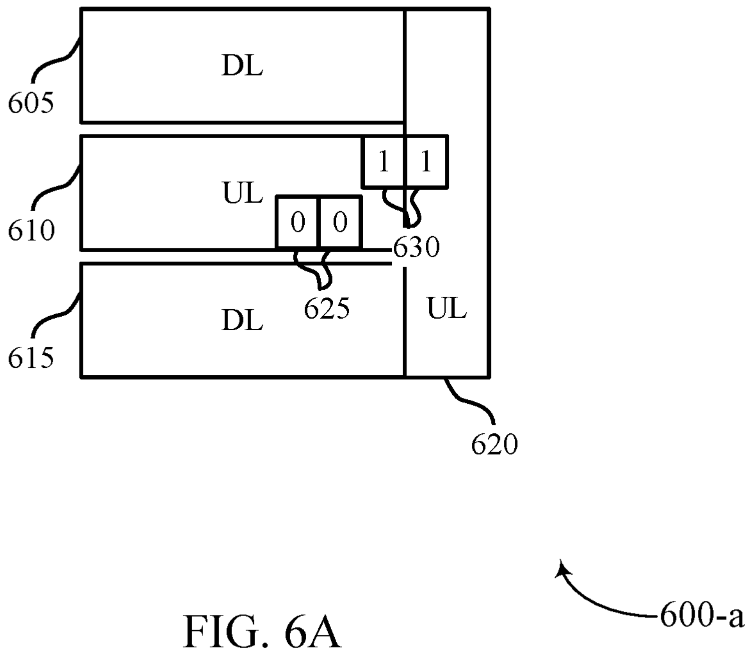
FIGS. 6A and 6B show examples of a transmission scheme that supports reference signal transmission in SBFD and non-SBFD slots in accordance with one or more aspects of the present disclosure.
Figure 6B:
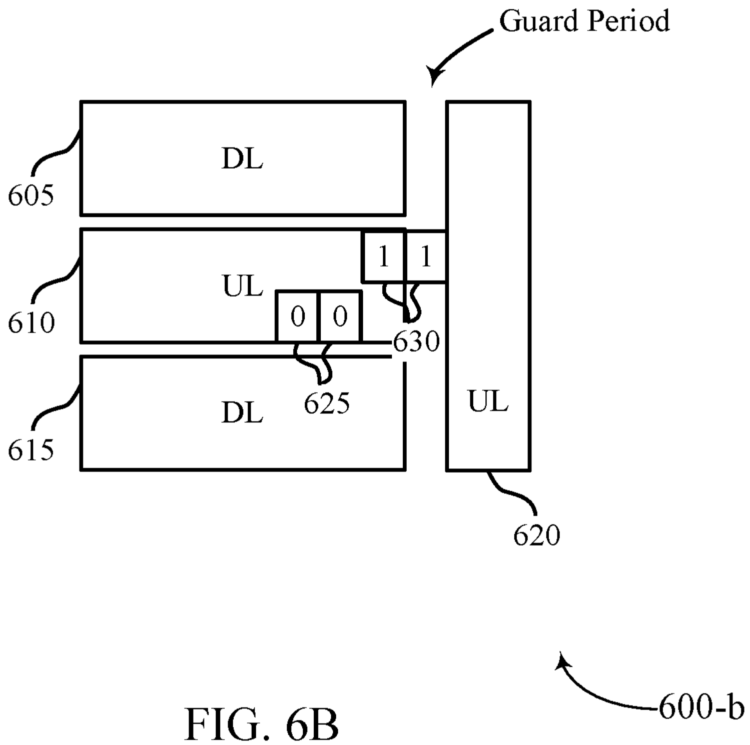

FIGS. 6A and 6B show examples of a transmission scheme 600 that supports reference signal transmission in SBFD and non-SBFD slots in accordance with one or more aspects of the present disclosure. Aspects of transmission scheme 600 may implement or be implemented by wireless communications system 100 and/or wireless communications system 200 and/or aspects of transmission schemes 300, 400, and/or 500. Aspects of transmission scheme 600 may be implemented at or implemented by a UE and/or network entity, which may be examples of the corresponding devices described herein.

Transmission scheme 600-*a* of FIG. 6A illustrates a non-limiting example of a mixed SBFD and non-SBFD symbol slot where multi-symbol SRS transmissions are scheduled with frequency hopping and within an uplink subband during both the SBFD symbol(s) and the non-SBFD symbols. Transmission scheme 600-*b* of FIG. 6B illustrates a non-limiting example of a mixed SBFD and non-SBFD symbol slot where multi-symbol SRS transmissions are scheduled with frequency hopping and within an uplink subband during both the SBFD symbol(s) and the non-SBFD symbol(s) that are separated by a guard period.

Aspects of the techniques described herein provide for a transmission scheme to be applied by the UE. The transmission scheme may generally define a transmit or drop rule for SRS transmissions scheduled during slots having both SBFD symbols and non-SBFD symbols. For example, the network entity may transmit, provide, or otherwise convey an indication of resource parameters for the UE to use for performing SRS transmissions during the SBFD/non-SBFD symbol slot. The network entity may provide the indication via RRC signaling, MAC-CE signaling, and/or via other signaling.

The resource parameters may generally identify or otherwise provide the time resources, frequency resources, spatial resources, code resources, and/or other parameters used by the UE to perform the SRS transmissions. The resource parameters may configure the SRS transmissions as multi-symbol SRS transmissions. The multi-symbol SRS transmissions may include the UE transmitting multiple repetitions or instances of the SRS transmission. For example, the UE may transmit multiple repetitions in different frequency resources and/or in different time resources. That is, the multi-symbol SRS transmissions may include SRS transmissions in a subset of (e.g., one or more) REs during multiple symbols of the slot.

The resource parameters may identify or otherwise configure the SRS transmissions with frequency hopping. In the non-limiting example shown, this may include a first subset of SRS transmissions (e.g., SRS 625) being scheduled in a first hop using frequency resources '0' and a second subset of SRS transmissions (e.g., SRS 630) being scheduled in a second hop using frequency resources '1.' That is, the multi-symbol SRS transmissions may include frequency hopping with a first hop of the frequency hopping including the first subset of SRS transmissions (e.g., SRS 625) during the at least one SBFD symbol and a second hop of the frequency hopping including a first instance of the second subset of SRS transmissions during at least one SBFD symbol and a second instance of the second subset of SRS transmissions during the at least one non-SBFD symbol. That is, the frequency hopping may include one instance of the frequency hopping using frequency resources '1' occurring during an SBFD symbol and one instance of the frequency hopping using frequency resource occurring during a non-SBFD symbol. The transmission scheme may be based on the frequency hopping.

Transmission scheme 600 illustrates a slot containing both SBFD symbols and non-SBFD symbols (e.g., a mixed slot or a SBFD/non-SBFD slot). The slot may have an associated bandwidth (e.g., a downlink bandwidth or BWP and/or an uplink bandwidth or BWP). The slot may include one or more SBFD symbols during which the frequency resources of the bandwidth are divided into downlink subband(s) and uplink subband(s). In the non-limiting example shown, this may include the bandwidth associated with the UE being divided into a downlink subband 605, an uplink subband 610, and a downlink subband 615, during the SBFD symbols. However, it is to be understood that the bandwidth may be divided into other mixtures of downlink and uplink subbands during the SBFD symbols.

The slot may include one or more non-SBFD symbols during which the frequency resources of the bandwidth are allocated to either downlink communications (e.g., a downlink band) or uplink communications (e.g., an uplink band). In the non-limiting example shown, this may include the bandwidth associated with the UE being allocated to uplink band 620 during the non-SBFD symbols. However, it is to be understood that the bandwidth may be allocated to a downlink band in some examples. In some examples, the slot may include an initial subset of symbols (e.g., one or more) where the bandwidth is allocated to a downlink band, a final subset of symbols (e.g., one or more) where the bandwidth is allocated to an uplink band, and an intermediate subset of symbols where the bandwidth is divided into uplink and downlink subbands.

The resource parameters may configure the UE to perform multi-symbol SRS transmissions with frequency hopping. As illustrated by way of non-limiting example, the resource parameters for the multi-symbol SRS configure the transmissions with frequency hopping during a slot that includes both SBFD symbols and non-SBFD symbols. The multi-symbol SRS transmissions may include a first subset of the SRS transmissions in a first hop being scheduled during SBFD symbols and a second subset of the SRS transmissions in a second hop being scheduled during non-SBFD symbols and/or during a guard period between the SBFD symbols and the non-SBFD symbols.

Turning first to transmission scheme 600-*a* of FIG. 6A, the transmission scheme may generally define a transmit or drop rule based on the frequency resources and/or time resources associated with SRS transmissions, as well as the frequency hopping. Transmission scheme 600-*a* illustrates a non-limiting example where the frequency resource for a first subset of SRS transmissions in the first hop and the second subset of SRS transmissions in the second hop are within an uplink subband during at least one SBFD symbol and during at least one non-SBFD symbol. Transmission scheme 600-*a* may be based on the frequency resource and the frequency hopping. That is, in this non-limiting example the SRS transmissions may be scheduled (e.g., based on the resource parameters) with frequency resources within (e.g., fully overlapping) the uplink subband 610 as well as with time resources during both the SBFD symbols and the non-SBFD symbol(s) and/or during the guard period. In this example, various examples of the transmission scheme may be applied by the UE when the multi-symbol SRS transmissions are scheduled with frequency hopping within an uplink subband in the frequency domain and during both SBFD symbol(s) and non-SBFD symbol(s) in the time domain.

One example of a transmission scheme may include a transmit rule where the UE performs transmission (e.g., transmits) the multi-symbol SRS transmissions with frequency hopping. In this example where the time resources of the SRS resource is mapped across both SBFD and non-SBFD symbols in the slot and the SRS resource is configured with intra-slot frequency hopping and the second hop maps to SBFD and non-SBFD symbols, the transmission scheme may include the UE transmitting the first subset of SRS transmissions during the SBFD symbols and the second subset of SRS transmissions during the non-SBFD symbols. That is, the UE may transmit SRS 625 (e.g., two repetitions/instances using frequency resources '0') during the SBFD symbol, transmit one instance of SRS 630 (e.g., one repetition using frequency resources '1') during the SBFD symbols, and then transmit the second instance of SRS 630 (e.g., another repetition using frequency resources '1') during the non-SBFD symbols.

In some examples, the UE performing the transmission of SRS 625 and SRS 630 may be based on certain conditions being satisfied, such as is discussed above. For example, the SRS hops may be performed (e.g., not dropped) if the transmission parameters (e.g., power, phase, timing, QCL, and more) are the same across the SBFD and the non-SBFD symbols, when there is no guard period configured, the phase coherence is the same across SBFD and non-SBFD symbols, and more.

Turning next to transmission scheme 600-*b* of FIG. 6B, the transmission scheme may generally define a transmit or drop rule based on the frequency resources and/or time resources associated with SRS transmissions, as well as the frequency hopping. Transmission scheme 600-*b* illustrates a non-limiting example where the frequency resource for a first subset of SRS transmissions in the first hop and the second subset of SRS transmissions in the second hop are within an uplink subband during at least one SBFD symbol and during at least one non-SBFD symbol. In the non-limiting example shown, the resource parameters may further include a guard period scheduled between the SBFD symbols and the non-SBFD symbols. Transmission scheme 600-*b* may be based on the frequency resource, the frequency hopping, and the presence of the guard period.

That is, in this non-limiting example the SRS transmissions may be scheduled (e.g., based on the resource parameters) with frequency resources within (e.g., fully overlapping) the uplink subband 610 as well as with time resources during both the SBFD symbols and the non-SBFD symbol(s) (or at least during the guard period). In this example, various examples of the transmission scheme may be applied by the UE when the multi-symbol SRS transmissions are scheduled with frequency hopping within an uplink subband in the frequency domain and during both SBFD symbol(s) and non-SBFD symbol(s) in the time domain, as well as the guard period.

The transmission scheme may be based on the presence or absence of a guard period scheduled between the SBFD and non-SBFD symbols. The guard period may generally include one or more symbol(s) being reserved between the SBFD symbols and the non-SBFD symbols. The guard period may allow the UE to implement procedures associated with transitioning from subband-based communications to full bandwidth-based communications, to retune from downlink communications to uplink communications, as well as other operations. The transmission scheme to be applied in this example may include the UE either performing or dropping at least the SRS transmission(s) mapped to the guard period. Additionally, or alternatively, the UE may drop all SRS transmissions mapped to the guard period or scheduled after the guard period. In this example, the UE may perform the first subset of SRS transmissions and drop none, the first instance, or all instances of the second subset of SRS transmissions (as well as SRS transmissions scheduled during the guard period) based on the guard period being present. That is, in this example the second SRS hop using frequency resources ‘1’ may be dropped either fully (e.g., both instances of SRS 630) or partially (e.g., only the second instance of SRS 630 mapped to the guard period is dropped).

It is to be understood that the techniques described with respect to FIGS. 2-4 may be applied when the multi-symbol SRS transmissions are scheduled with frequency hopping. That is, the case when the SRS resources are configured with repetition and with frequency hopping, some of the hops may happen in both SBFD and non-SBFD. The frequency hopping may be intra-slot or inter-slot and the earlier described techniques may be applied for each SRS frequency hop.

Figure 7:
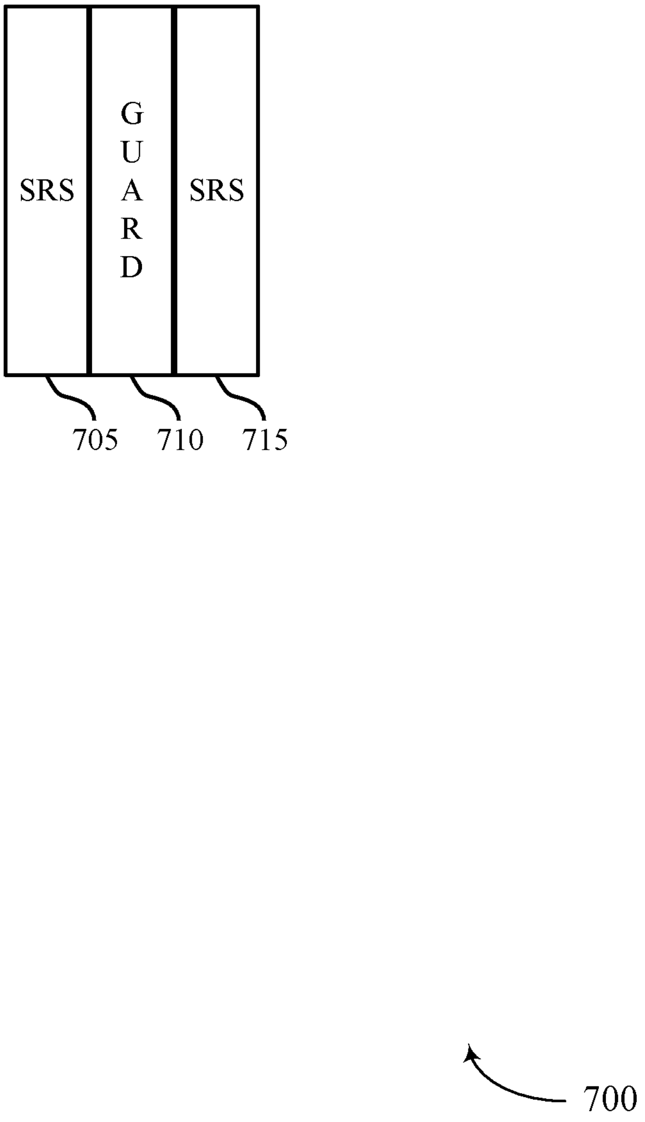
FIG. 7 shows an example of a gap configuration that supports reference signal transmission in SBFD and non-SBFD slots in accordance with one or more aspects of the present disclosure.

FIG. 7 shows an example of a gap configuration 700 that supports reference signal transmission in SBFD and non-SBFD slots in accordance with one or more aspects of the present disclosure. Gap configuration 700 may implement aspects of wireless communications system 100 and/or 200 and/or aspects of transmission schemes 300-600. Aspects of gap configuration 700 may be implemented at or implemented by a UE and/or a network entity, which may be examples of the corresponding devices described herein.

In some scenarios, SRS transmissions may be scheduled to support or otherwise enable downlink channel state information (CSI) acquisition. This may include the SRS transmissions being performed with antenna switching (e.g., using xTyR, wherein x is the number of transmit antennas, ports, or spatial layers and y is the number of receive antennas, ports, or spatial layers). To support downlink CSI acquisition using SRS transmissions, a guard period is configured between the SRS resource. In this non-limiting example, this may include an SRS 705 during an SBFD symbol and an SRS 715 during a non-SBFD symbol, which are separated in the time domain by a guard period 710. In some networks, the UE does not transmit during the guard period 710, although the guard period 710 is treated as if the SRS is configured and has the same priority rules.

In the situation where the guard period 710 is not configured between the SBFD and non-SBFD symbols, the UE may perform the SRS transmissions using antenna switching. However, in some scenarios the guard period 710 is configured between the SBFD and non-SBFD symbols and the UE performs antenna switching between the two symbol types. For example, the network entity may transmit or otherwise provide (and the UE may receive or otherwise obtain) an indication of resource parameters for performing the SRS transmissions during the slot containing SRS 705 during an SBFD symbol, SRS 715 during a non-SBFD symbol, and with the guard period 710 configured between the SBFD symbol(s) and the non-SBFD symbol(s). The resource parameters may configure the multi-symbol SRS transmissions with frequency hopping.

In some aspects, the UE may perform the multi-symbol SRS transmissions with frequency hopping according to a transmission scheme associated with the resource parameters. The transmission scheme may generally define or otherwise identify the transmit or drop rule for the multi-symbol SRS transmissions. In some aspects, the transmission scheme may be based on SRS 705 being scheduled during the SBFD symbol and SRS 715 (or at least one or more instances of SRS 715) being scheduled in the SBFD symbols, in non-SBFD symbols, and/or the presence of guard period 710.

In one example, the transmission scheme may include the UE dropping SRS resources scheduled during the guard period 710. For example, the UE may perform the first subset of SRS transmissions (e.g., SRS 705) and the second subset of SRS transmissions (e.g., SRS 715), but may drop any SRS transmissions scheduled during the guard period 710.

In another example, the transmission scheme may include the UE performing the first subset of SRS transmissions (e.g., SRS 705) and dropping the second subset of SRS transmissions (e.g., SRS 705). When the SRS switching guard period is configured, the UE may use the transition period as the guard period or partially use the guard period as the transition period. That is, the transition period may be reserved for the switching between the SBFD and non-SBFD symbols. For example, the UE may not perform radio frequency (RF), hardware, baseband processing for SRS antenna switching in the guard period 710. Accordingly, the UE may drop the SRS transmissions scheduled during the guard period 710 as well as SRS transmissions scheduled after the guard period 710 (e.g., SRS 715).

In the situation where the multi-symbol SRS transmissions are scheduled with frequency hopping, the transmission scheme may be based on where the hops start. When the SRS frequency hopping occurs at the boundary between SBFD and non-SBFD symbols (e.g., when no guard period is configured) and the second frequency hop using frequency resources ‘1’ start at the first non-SBFD symbol, then the frequency hops may be contained within one symbol type (e.g., during the non-SBFD symbols). When the SRS frequency hopping occurs at the boundary between SBFD and non-SBFD symbols (again when no guard period is configured) and the second frequency hop using frequency resources '1' cross the boundary, then the frequency hops may span both symbol types (e.g., during both SBFD and non-SBFD symbol types). In these scenarios, the UE may perform or drop the SRS transmissions in the second subset based on where the hopping instances fall with respect to the boundary.

Figure 8:
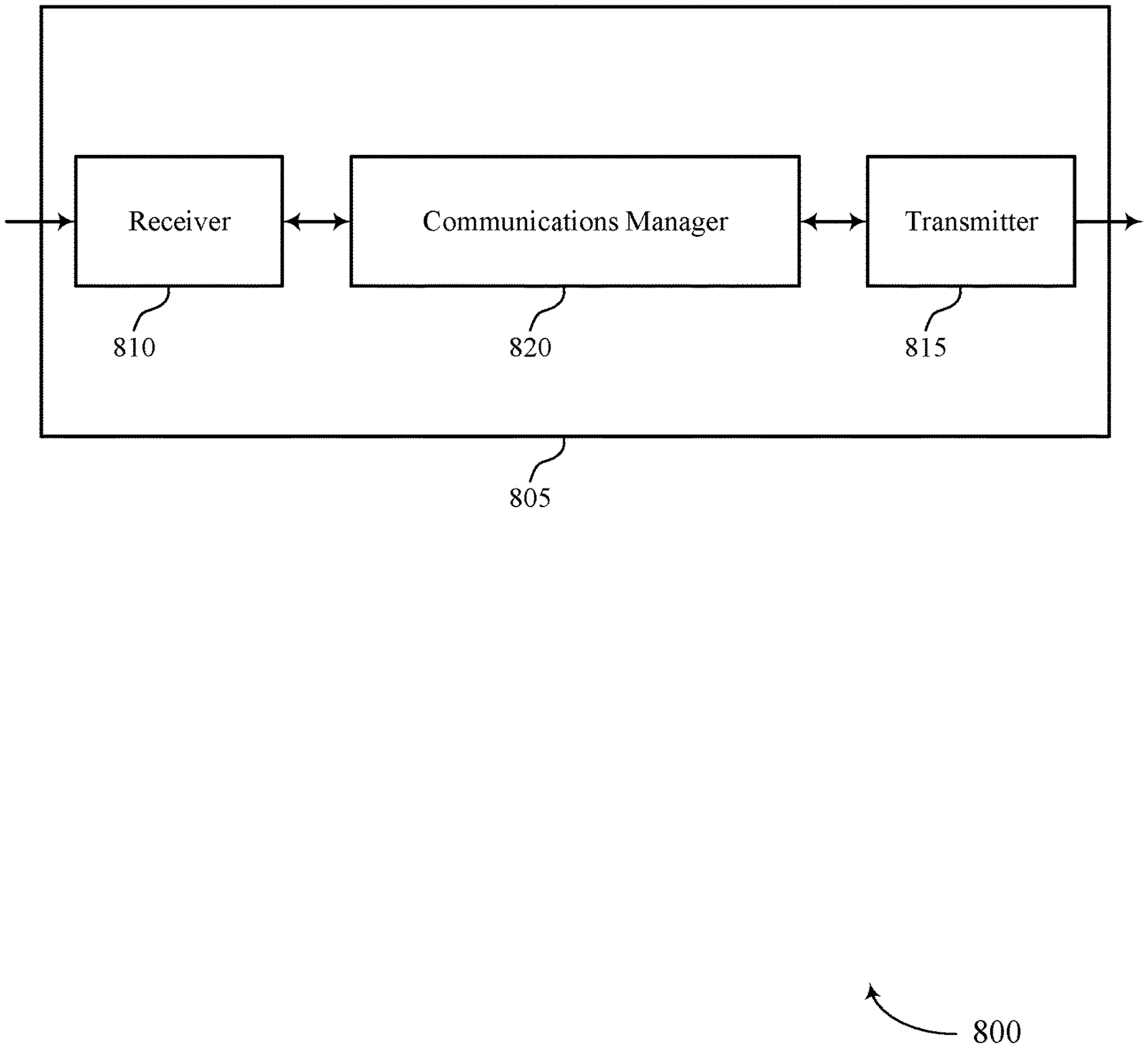
FIGS. 8 and 9 show block diagrams of devices that support reference signal transmission in SBFD and non-SBFD slots in accordance with one or more aspects of the present disclosure.

FIG. 8 shows a block diagram 800 of a device 805 that supports reference signal transmission in SBFD and non-SBFD slots in accordance with one or more aspects of the present disclosure. The device 805 may be an example of aspects of a UE 115 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled with at least one memory, to, individually or collectively, support or enable the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to reference signal transmission in SBFD and non-SBFD slots). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to reference signal transmission in SBFD and non-SBFD slots). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of reference signal transmission in SBFD and non-SBFD slots as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a digital signal processor (DSP), a central processing unit (CPU), a graphics processing unit (GPU), a neural processing unit (NPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software) executed by at least one processor. If implemented in code executed by at least one processor, the functions of the communications manager 820, the receiver 810, the transmitter 815, or various combinations or components thereof may be performed by a general-purpose processor, a DSP, a CPU, a GPU, a NPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. For example, the communications manager 820 is capable of, configured to, or operable to support a means for receiving an indication of resource parameters for performing SRS transmissions during a slot including at least one SBFD symbol and at least one non-SBFD symbol. The communications manager 820 is capable of, configured to, or operable to support a means for performing multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one non-SBFD symbol of the slot.

Additionally, or alternatively, the communications manager 820 may support wireless communications in accordance with examples as disclosed herein. For example, the communications manager 820 is capable of, configured to, or operable to support a means for receiving an indication of resource parameters for performing SRS transmissions during a slot including at least one SBFD symbol, at least one non-SBFD symbol, and a gap period between the at least one SBFD symbol and the at least one non-SBFD symbol. The communications manager 820 is capable of, configured to, or operable to support a means for performing multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one SBFD symbol, in the at least one non-SBFD symbol, or both, of the slot and a location of a SRS guard period relative to a transition between the SBFD symbol and the non-SBFD symbol.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for improving multi-symbol SRS transmissions during mixed SBFD and non-SBFD symbol type slots according to a transmission scheme. The transmission scheme may define a transmit rule or drop rule for the SRS transmissions based on the slot including both SBFD and non-SBFD symbols.

Figure 9:
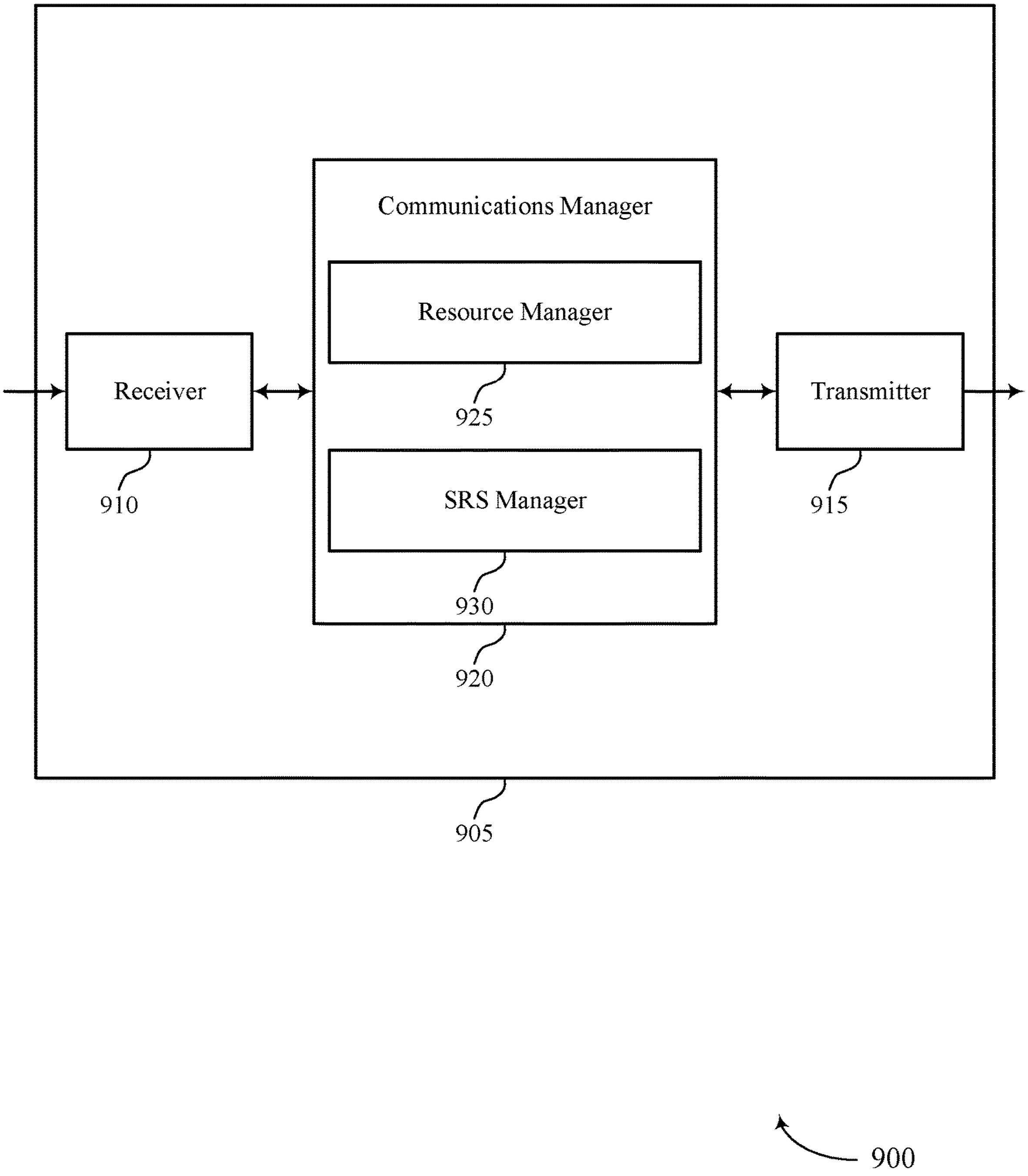

FIG. 9 shows a block diagram 900 of a device 905 that supports reference signal transmission in SBFD and non-SBFD slots in accordance with one or more aspects of the present disclosure. The device 905 may be an example of aspects of a device 805 or a UE 115 as described herein. The device 905 may include a receiver 910, a transmitter 915, and a communications manager 920. The device 905, or one of more components of the device 905 (e.g., the receiver 910, the transmitter 915, and the communications manager 920), may include at least one processor, which may be coupled with at least one memory, to support the described techniques. Each of these components may be in communication with one another (e.g., via one or more buses).

The receiver 910 may provide a means for receiving information such as packets, user data, control information, or any combination thereof associated with various information channels (e.g., control channels, data channels, information channels related to reference signal transmission in SBFD and non-SBFD slots). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to reference signal transmission in SBFD and non-SBFD slots). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of reference signal transmission in SBFD and non-SBFD slots as described herein. For example, the communications manager 920 may include a resource manager 925 an SRS manager 930, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. The resource manager 925 is capable of, configured to, or operable to support a means for receiving an indication of resource parameters for performing SRS transmissions during a slot including at least one SBFD symbol and at least one non-SBFD symbol. The SRS manager 930 is capable of, configured to, or operable to support a means for performing multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one non-SBFD symbol of the slot.

Additionally, or alternatively, the communications manager 920 may support wireless communications in accordance with examples as disclosed herein. The resource manager 925 is capable of, configured to, or operable to support a means for receiving an indication of resource parameters for performing SRS transmissions during a slot including at least one SBFD symbol, at least one non-SBFD symbol, and a gap period between the at least one SBFD symbol and the at least one non-SBFD symbol. The SRS manager 930 is capable of, configured to, or operable to support a means for performing multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one SBFD symbol, in the at least one non-SBFD symbol, or both, of the slot and a location of a SRS guard period relative to a transition between the SBFD symbol and the non-SBFD symbol.

Figure 10:
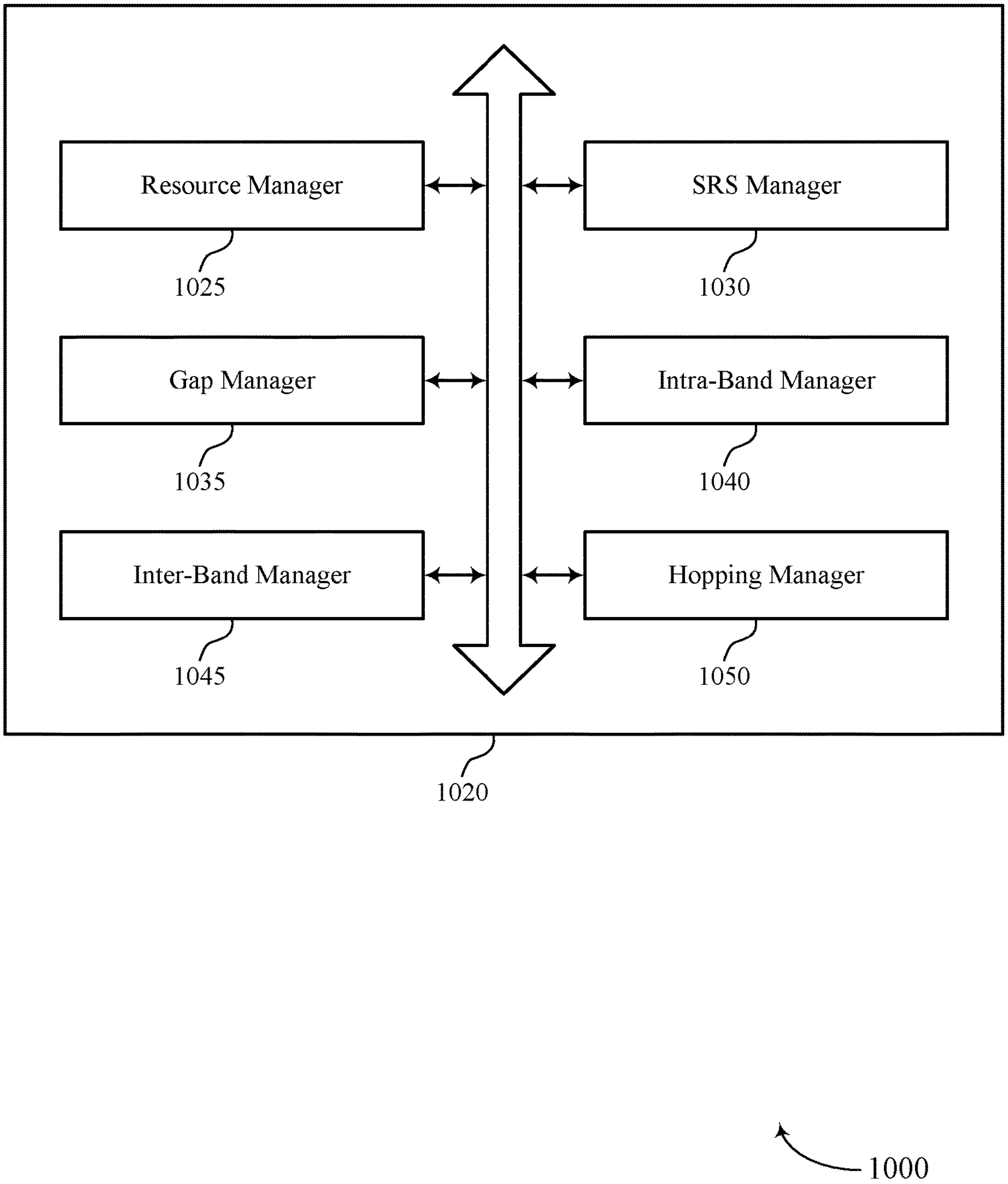
FIG. 10 shows a block diagram of a communications manager that supports reference signal transmission in SBFD and non-SBFD slots in accordance with one or more aspects of the present disclosure.

FIG. 10 shows a block diagram 1000 of a communications manager 1020 that supports reference signal transmission in SBFD and non-SBFD slots in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of reference signal transmission in SBFD and non-SBFD slots as described herein. For example, the communications manager 1020 may include a resource manager 1025, an SRS manager 1030, a gap manager 1035, an intra-band manager 1040, an inter-band manager 1045, a hopping manager 1050, or any combination thereof. Each of these components, or components or subcomponents thereof (e.g., one or more processors, one or more memories), may communicate, directly or indirectly, with one another (e.g., via one or more buses).

The communications manager 1020 may support wireless communications in accordance with examples as disclosed herein. The resource manager 1025 is capable of, configured to, or operable to support a means for receiving an indication of resource parameters for performing SRS transmissions during a slot including at least one SBFD symbol and at least one non-SBFD symbol. The SRS manager 1030 is capable of, configured to, or operable to support a means for performing multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one non-SBFD symbol of the slot. In some examples, a frequency resource for the first subset of SRS transmissions and the second subset of SRS transmissions is within an uplink subband during the at least one SBFD symbol and during the at least one non-SBFD symbol. In some examples, the transmission scheme is based on the frequency resource.

In some examples, the intra-band manager 1040 is capable of, configured to, or operable to support a means for dropping the first subset of SRS transmissions and the second subset of SRS transmissions according to the transmission scheme. In some examples, the intra-band manager 1040 is capable of, configured to, or operable to support a means for dropping the second subset of SRS transmissions and performing the first subset of SRS transmissions according to the transmission scheme. In some examples, the intra-band manager 1040 is capable of, configured to, or operable to support a means for dropping the first subset of SRS transmissions and performing the second subset of SRS transmissions according to the transmission scheme.

In some examples, the intra-band manager 1040 is capable of, configured to, or operable to support a means for performing the first subset of SRS transmissions and the second subset of SRS transmissions according to the transmission scheme. In some examples, the transmission scheme is based on a phase continuity being maintained, a same set of transmission parameters being applied, a presence or an absence of a guard period, or a combination thereof, between the first subset of SRS transmissions and the second subset of SRS transmissions. In some examples, the transmission scheme is based on a presence or an absence of a guard period between the at least one SBFD symbol and the at least one non-SBFD symbol. In some examples, a frequency resource for the first subset of SRS transmissions and the second subset of SRS transmissions is wider than an uplink subband during the at least one SBFD symbol and is within an uplink bandwidth during the at least one non-SBFD symbol. In some examples, the transmission scheme is based on the frequency resource.

In some examples, the inter-band manager 1045 is capable of, configured to, or operable to support a means for dropping the first subset of SRS transmissions and the second subset of SRS transmissions according to the transmission scheme. In some examples, the inter-band manager 1045 is capable of, configured to, or operable to support a means for dropping the first subset of SRS transmissions and performing the second subset of SRS transmissions according to the transmission scheme.

In some examples, the inter-band manager 1045 is capable of, configured to, or operable to support a means for performing the first subset of SRS transmissions during the at least one SBFD symbol and the second subset of SRS transmissions during the at least one non-SBFD symbol according to a truncated SRS sequence, the truncated SRS sequence based on the transmission scheme. In some examples, the inter-band manager 1045 is capable of, configured to, or operable to support a means for performing the first subset of SRS transmissions during the at least one SBFD symbol and the second subset of SRS transmissions during the at least one non-SBFD symbol according to an updated SRS sequence, wherein a length of the updated SRS sequence is based on the transmission scheme within an uplink subband frequency resource.

In some examples, the multi-symbol SRS transmissions include frequency hopping with a first hop of the frequency hopping including the first subset of SRS transmissions during the at least one SBFD symbol and a second hop of the frequency hopping including the second subset of SRS transmissions during the at least one non-SBFD symbol. In some examples, the transmission scheme is based on the frequency hopping.

In some examples, the hopping manager 1050 is capable of, configured to, or operable to support a means for performing the first subset of SRS transmissions and the second subset of SRS transmissions according to the transmission scheme. In some examples, the transmission scheme is based on a phase continuity being maintained, a same set of transmission parameters being applied, a presence or an absence of a guard period, or a combination thereof, between the first subset of SRS transmissions and the second subset of SRS transmissions. In some examples, the hopping manager 1050 is capable of, configured to, or operable to support a means for performing or dropping one or more instances of the second subset of SRS transmissions according to a presence or an absence of a guard period scheduled between the at least one SBFD symbol and the at least one non-SBFD symbol.

In some examples, the multi-symbol SRS transmissions include frequency hopping with a first hop of the frequency hopping including the first subset of SRS transmissions during the at least one SBFD symbol and a second hop of the frequency hopping including a first instance of the second subset of SRS transmissions during the at least one SBFD symbol and a second instance of the second subset of SRS transmissions during the at least one non-SBFD symbol. In some examples, the transmission scheme is based on the frequency hopping.

In some examples, the hopping manager 1050 is capable of, configured to, or operable to support a means for performing the first subset of SRS transmissions and the second subset of SRS transmissions according to the transmission scheme. In some examples, the transmission scheme is based on a phase continuity being maintained, a same set of transmission parameters being applied, a presence or an absence of a guard period, or a combination thereof, between the first subset of SRS transmissions and the second subset of SRS transmissions. In some examples, the hopping manager 1050 is capable of, configured to, or operable to support a means for performing the first subset of SRS transmissions and dropping the first instance, the second instance, or both, of the second subset of SRS transmissions according to the transmission scheme.

Additionally, or alternatively, the communications manager 1020 may support wireless communications in accordance with examples as disclosed herein. In some examples, the resource manager 1025 is capable of, configured to, or operable to support a means for receiving an indication of resource parameters for performing SRS transmissions during a slot including at least one SBFD symbol, at least one non-SBFD symbol, and a gap period between the at least one SBFD symbol and the at least one non-SBFD symbol. In some examples, the SRS manager 1030 is capable of, configured to, or operable to support a means for performing multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one SBFD symbol, in the at least one non-SBFD symbol, or both, of the slot and a location of a SRS guard period relative to a transition between the SBFD symbol and the non-SBFD symbol.

In some examples, the gap manager 1035 is capable of, configured to, or operable to support a means for performing the first subset of SRS transmissions and the second subset of SRS transmissions and dropping an SRS transmission scheduled during the gap period according to the transmission scheme.

In some examples, the gap manager 1035 is capable of, configured to, or operable to support a means for performing the first subset of SRS transmissions and dropping the second subset of SRS transmissions according to the transmission scheme.

Figure 11:
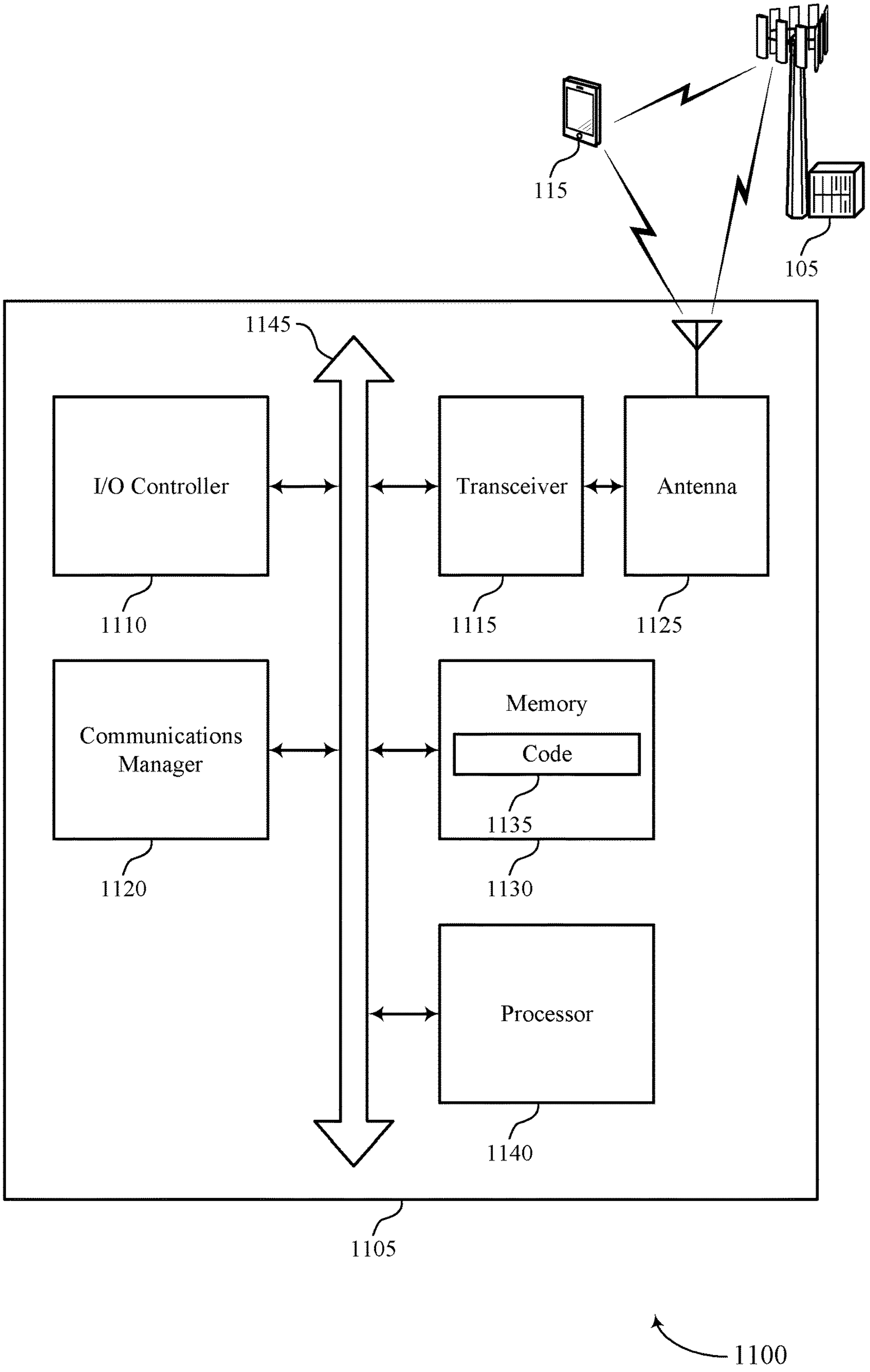
FIG. 11 shows a diagram of a system including a device that supports reference signal transmission in SBFD and non-SBFD slots in accordance with one or more aspects of the present disclosure.

FIG. 11 shows a diagram of a system 1100 including a device 1105 that supports reference signal transmission in SBFD and non-SBFD slots in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, at least one memory 1130, code 1135, and at least one processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of one or more processors, such as the at least one processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The at least one memory 1130 may include random access memory (RAM) and read-only memory (ROM). The at least one memory 1130 may store computer-readable, computer-executable code 1135 including instructions that, when executed by the at least one processor 1140, cause the device 1105 to perform various functions described herein. The code 1135 may be stored in a non-transitory computer-readable medium such as system memory or another type of memory. In some cases, the code 1135 may not be directly executable by the at least one processor 1140 but may cause a computer (e.g., when compiled and executed) to perform functions described herein. In some cases, the at least one memory 1130 may contain, among other things, a basic I/O system (BIOS) which may control basic hardware or software operation such as the interaction with peripheral components or devices.

The at least one processor 1140 may include an intelligent hardware device (e.g., a general-purpose processor, a DSP, a CPU, a GPU, a NPU, a microcontroller, an ASIC, an FPGA, a programmable logic device, a discrete gate or transistor logic component, a discrete hardware component, or any combination thereof). In some cases, the at least one processor 1140 may be configured to operate a memory array using a memory controller. In some other cases, a memory controller may be integrated into the at least one processor 1140. The at least one processor 1140 may be configured to execute computer-readable instructions stored in a memory (e.g., the at least one memory 1130) to cause the device 1105 to perform various functions (e.g., functions or tasks supporting reference signal transmission in SBFD and non-SBFD slots). For example, the device 1105 or a component of the device 1105 may include at least one processor 1140 and at least one memory 1130 coupled with or to the at least one processor 1140, the at least one processor 1140 and at least one memory 1130 configured to perform various functions described herein. In some examples, the at least one processor 1140 may include multiple processors and the at least one memory 1130 may include multiple memories. One or more of the multiple processors may be coupled with one or more of the multiple memories, which may, individually or collectively, be configured to perform various functions herein. In some examples, the at least one processor 1140 may be a component of a processing system, which may refer to a system (such as a series) of machines, circuitry (including, for example, one or both of processor circuitry (which may include the at least one processor 1140) and memory circuitry (which may include the at least one memory 1130)), or components, that receives or obtains inputs and processes the inputs to produce, generate, or obtain a set of outputs. The processing system may be configured to perform one or more of the functions described herein. As such, the at least one processor 1140 or a processing system including the at least one processor 1140 may be configured to, configurable to, or operable to cause the device 1105 to perform one or more of the functions described herein. Further, as described herein, being "configured to," being "configurable to," and being "operable to" may be used interchangeably and may be associated with a capability, when executing code stored in the at least one memory 1130 or otherwise, to perform one or more of the functions described herein.

The communications manager 1120 may support wireless communications in accordance with examples as disclosed herein. For example, the communications manager 1120 is capable of, configured to, or operable to support a means for receiving an indication of resource parameters for performing SRS transmissions during a slot including at least one SBFD symbol and at least one non-SBFD symbol. The communications manager 1120 is capable of, configured to, or operable to support a means for performing multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one non-SBFD symbol of the slot.

Additionally, or alternatively, the communications manager 1120 may support wireless communications in accordance with examples as disclosed herein. For example, the communications manager 1120 is capable of, configured to, or operable to support a means for receiving an indication of resource parameters for performing SRS transmissions during a slot including at least one SBFD symbol, at least one non-SBFD symbol, and a gap period between the at least one SBFD symbol and the at least one non-SBFD symbol. The communications manager 1120 is capable of, configured to, or operable to support a means for performing multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one SBFD symbol, in the at least one non-SBFD symbol, or both, of the slot and a location of a SRS guard period relative to a transition between the SBFD symbol and the non-SBFD symbol.

By including or configuring the communications manager 1120 in accordance with examples as described herein, the device 1105 may support techniques for improving multi-symbol SRS transmissions during mixed SBFD and non-SBFD symbol type slots according to a transmission scheme. The transmission scheme may define a transmit rule or drop rule for the SRS transmissions based on the slot including both SBFD and non-SBFD symbols.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the at least one processor 1140, the at least one memory 1130, the code 1135, or any combination thereof. For example, the code 1135 may include instructions executable by the at least one processor 1140 to cause the device 1105 to perform various aspects of reference signal transmission in SBFD and non-SBFD slots as described herein, or the at least one processor 1140 and the at least one memory 1130 may be otherwise configured to, individually or collectively, perform or support such operations.

Figure 12:
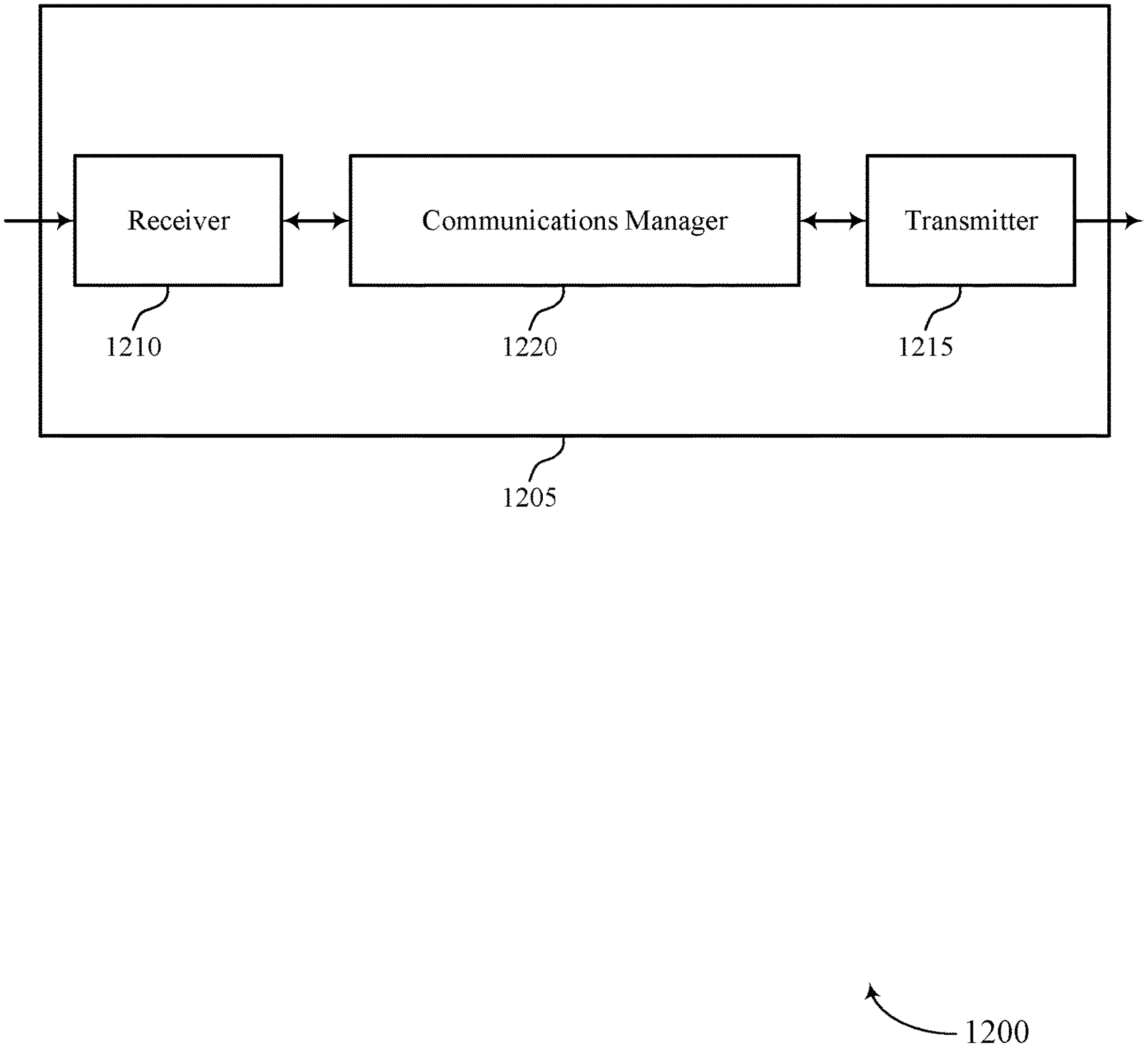
FIGS. 12 and 13 show block diagrams of devices that support reference signal transmission in SBFD and non-SBFD slots in accordance with one or more aspects of the present disclosure.

FIG. 12 shows a block diagram 1200 of a device 1205 that supports reference signal transmission in SBFD and non-SBFD slots in accordance with one or more aspects of the present disclosure. The device 1205 may be an example of aspects of a network entity 105 as described herein. The device 1205 may include a receiver 1210, a transmitter 1215, and a communications manager 1220. The device 1205, or one or more components of the device 1205 (e.g., the receiver 1210, the transmitter 1215, and the communications manager 1220), may include at least one processor, which may be coupled with at least one memory, to, individually or collectively, support or enable the described techniques. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of reference signal transmission in SBFD and non-SBFD slots as described herein. For example, the communications manager 1220, the receiver 1210, the transmitter 1215, or various combinations or components thereof may be capable of performing one or more of the functions described herein.

In some examples, the communications manager 1220, the receiver 1210, the transmitter 1215, or various combinations or components thereof may be implemented in hardware (e.g., in communications management circuitry). The hardware may include at least one of a processor, a DSP, a CPU, a GPU, a NPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1220, the receiver 1210, the transmitter 1215, or various combinations or components thereof may be implemented in code (e.g., as communications management software) executed by at least one processor. If implemented in code executed by at least one processor, the functions of the communications manager 1220, the receiver 1210, the transmitter 1215, or various combinations or components thereof may be performed by a general-purpose processor, a DSP, a CPU, a GPU, a NPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications in accordance with examples as disclosed herein. For example, the communications manager 1220 is capable of, configured to, or operable to support a means for transmitting, to a UE, an indication of resource parameters for the UE to perform SRS transmissions during a slot including at least one SBFD symbol and at least one non-SBFD symbol. The communications manager 1220 is capable of, configured to, or operable to support a means for receiving multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one non-SBFD symbol of the slot.

Additionally, or alternatively, the communications manager 1220 may support wireless communications in accordance with examples as disclosed herein. For example, the communications manager 1220 is capable of, configured to, or operable to support a means for transmitting, to a UE, an indication of resource parameters for performing SRS transmissions during a slot including at least one SBFD symbol, at least one non-SBFD symbol, and a gap period between the at least one SBFD symbol and the at least one non-SBFD symbol. The communications manager 1220 is capable of, configured to, or operable to support a means for receiving multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one SBFD symbol, in the at least one non-SBFD symbol, or both, of the slot and a location of a SRS guard period relative to a transition between the SBFD symbol and the non-SBFD symbol.

By including or configuring the communications manager 1220 in accordance with examples as described herein, the device 1205 (e.g., at least one processor controlling or otherwise coupled with the receiver 1210, the transmitter 1215, the communications manager 1220, or a combination thereof) may support techniques for improving multi-symbol SRS transmissions during mixed SBFD and non-SBFD symbol type slots according to a transmission scheme. The transmission scheme may define a transmit rule or drop rule for the SRS transmissions based on the slot including both SBFD and non-SBFD symbols.

Figure 13:
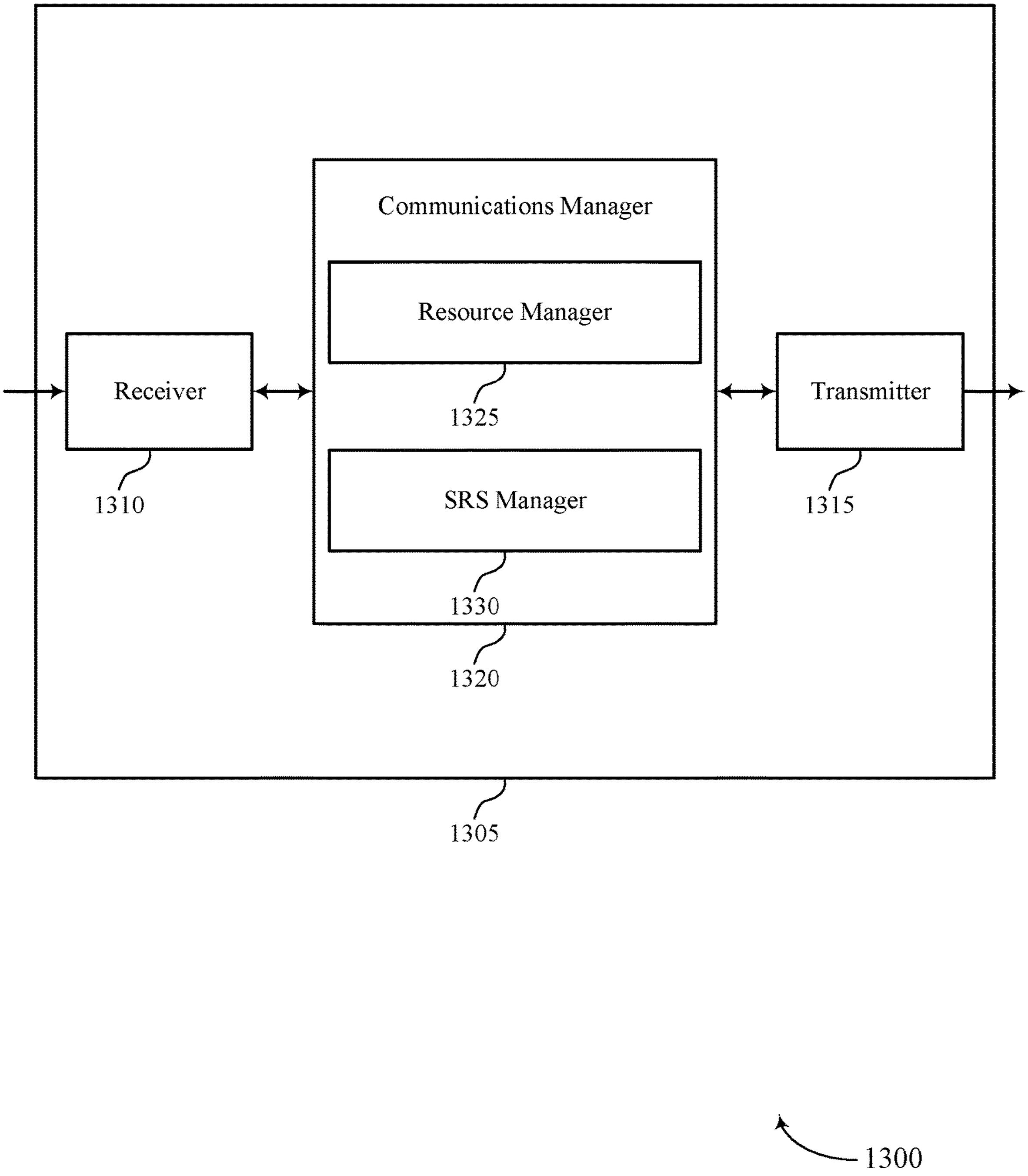

FIG. 13 shows a block diagram 1300 of a device 1305 that supports reference signal transmission in SBFD and non-SBFD slots in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305, or one of more components of the device 1305 (e.g., the receiver 1310, the transmitter 1315, and the communications manager 1320), may include at least one processor, which may be coupled with at least one memory, to support the described techniques. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of reference signal transmission in SBFD and non-SBFD slots as described herein. For example, the communications manager 1320 may include a resource manager 1325 an SRS manager 1330, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications in accordance with examples as disclosed herein. The resource manager 1325 is capable of, configured to, or operable to support a means for transmitting, to a UE, an indication of resource parameters for the UE to perform SRS transmissions during a slot including at least one SBFD symbol and at least one non-SBFD symbol. The SRS manager 1330 is capable of, configured to, or operable to support a means for receiving multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one non-SBFD symbol of the slot.

Additionally, or alternatively, the communications manager 1320 may support wireless communications in accordance with examples as disclosed herein. The resource manager 1325 is capable of, configured to, or operable to support a means for transmitting, to a UE, an indication of resource parameters for performing SRS transmissions during a slot including at least one SBFD symbol, at least one non-SBFD symbol, and a gap period between the at least one SBFD symbol and the at least one non-SBFD symbol. The SRS manager 1330 is capable of, configured to, or operable to support a means for receiving multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one SBFD symbol, in the at least one non-SBFD symbol, or both, of the slot and a location of a SRS guard period relative to a transition between the SBFD symbol and the non-SBFD symbol.

Figure 14:
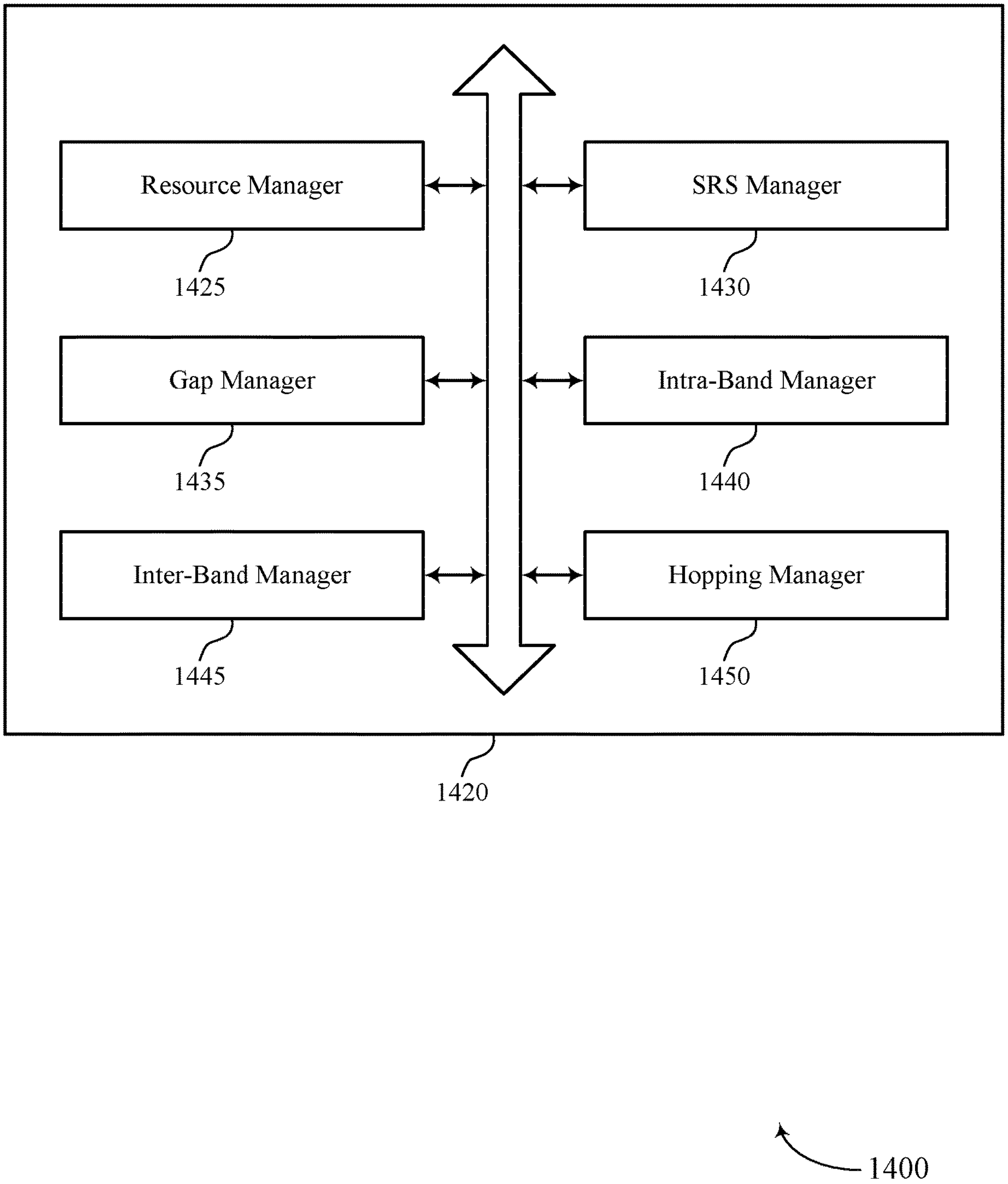
FIG. 14 shows a block diagram of a communications manager that supports reference signal transmission in SBFD and non-SBFD slots in accordance with one or more aspects of the present disclosure.

FIG. 14 shows a block diagram 1400 of a communications manager 1420 that supports reference signal transmission in SBFD and non-SBFD slots in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of reference signal transmission in SBFD and non-SBFD slots as described herein. For example, the communications manager 1420 may include a resource manager 1425, an SRS manager 1430, a gap manager 1435, an intra-band manager 1440, an inter-band manager 1445, a hopping manager 1450, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1420 may support wireless communications in accordance with examples as disclosed herein. The resource manager 1425 is capable of, configured to, or operable to support a means for transmitting, to a UE, an indication of resource parameters for the UE to perform SRS transmissions during a slot including at least one SBFD symbol and at least one non-SBFD symbol. The SRS manager 1430 is capable of, configured to, or operable to support a means for receiving multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one non-SBFD symbol of the slot.

In some examples, a frequency resource for the first subset of SRS transmissions and the second subset of SRS transmissions is within an uplink subband during the at least one SBFD symbol and during the at least one non-SBFD symbol. In some examples, the transmission scheme is based on the frequency resource.

In some examples, the intra-band manager 1440 is capable of, configured to, or operable to support a means for dropping reception of the first subset of SRS transmissions and the second subset of SRS transmissions according to the transmission scheme. In some examples, the intra-band manager 1440 is capable of, configured to, or operable to support a means for dropping reception of the second subset of SRS transmissions and receiving the first subset of SRS transmissions according to the transmission scheme.

In some examples, the intra-band manager 1440 is capable of, configured to, or operable to support a means for dropping reception of the first subset of SRS transmissions and receiving the second subset of SRS transmissions according to the transmission scheme. In some examples, the intra-band manager 1440 is capable of, configured to, or operable to support a means for receiving the first subset of SRS transmissions and the second subset of SRS transmissions according to the transmission scheme. In some examples, the transmission scheme is based on a phase continuity being maintained, a same set of transmission parameters being applied, a presence or an absence of a guard period, or a combination thereof, between the first subset of SRS transmissions and the second subset of SRS transmissions.

In some examples, the transmission scheme is based on a presence or an absence of a guard period between the at least one SBFD symbol and the at least one non-SBFD symbol. In some examples, a frequency resource for the first subset of SRS transmissions and the second subset of SRS transmissions is wider than an uplink subband during the at least one SBFD symbol and is within an uplink bandwidth during the at least one non-SBFD symbol. In some examples, the transmission scheme is based on the frequency resource.

In some examples, the inter-band manager 1445 is capable of, configured to, or operable to support a means for dropping reception of the first subset of SRS transmissions and the second subset of SRS transmissions according to the transmission scheme. In some examples, the inter-band manager 1445 is capable of, configured to, or operable to support a means for dropping reception of the first subset of SRS transmissions and receiving the second subset of SRS transmissions according to the transmission scheme.

In some examples, the inter-band manager 1445 is capable of, configured to, or operable to support a means for receiving the first subset of SRS transmissions during the at least one SBFD symbol and the second subset of SRS transmissions during the at least one non-SBFD symbol according to a truncated SRS sequence, the truncated SRS sequence based on the transmission scheme. In some examples, the inter-band manager 1445 is capable of, configured to, or operable to support a means for receiving the first subset of SRS transmissions during the at least one SBFD symbol and the second subset of SRS transmissions during the at least one non-SBFD symbol according to an updated SRS sequence, wherein a length of the updated SRS sequence is based on the transmission scheme within an uplink subband frequency resource.

In some examples, the multi-symbol SRS transmissions include frequency hopping with a first hop of the frequency hopping including the first subset of SRS transmissions during the at least one SBFD symbol and a second hop of the frequency hopping including the second subset of SRS transmissions during the at least one non-SBFD symbol. In some examples, the transmission scheme is based on the frequency hopping.

In some examples, the hopping manager 1450 is capable of, configured to, or operable to support a means for receiving the first subset of SRS transmissions and the second subset of SRS transmissions according to the transmission scheme. In some examples, the transmission scheme is based on a phase continuity being maintained, a same set of transmission parameters being applied, a presence or an absence of a guard period, or a combination thereof, between the first subset of SRS transmissions and the second subset of SRS transmissions. In some examples, the hopping manager 1450 is capable of, configured to, or operable to support a means for receiving or dropping reception of one or more instances of the second subset of SRS transmissions according to a presence or an absence of a guard period between the at least one SBFD symbol and the at least one non-SBFD symbol.

In some examples, the multi-symbol SRS transmissions include frequency hopping with a first hop of the frequency hopping including the first subset of SRS transmissions during the at least one SBFD symbol and a second hop of the frequency hopping including a first instance of the second subset of SRS transmissions during the at least one SBFD symbol and a second instance of the second subset of SRS transmissions during the at least one non-SBFD symbol. In some examples, the transmission scheme is based on the frequency hopping.

In some examples, the hopping manager 1450 is capable of, configured to, or operable to support a means for receiving the first subset of SRS transmissions and the second subset of SRS transmissions according to the transmission scheme. In some examples, the transmission scheme is based on a phase continuity being maintained, a same set of transmission parameters being applied, a presence or an absence of a guard period, or a combination thereof, between the first subset of SRS transmissions and the second subset of SRS transmissions. In some examples, the hopping manager 1450 is capable of, configured to, or operable to support a means for receiving the first subset of SRS transmissions and dropping the first instance, the second instance, or both, of the second subset of SRS transmissions according to the transmission scheme.

Additionally, or alternatively, the communications manager 1420 may support wireless communications in accordance with examples as disclosed herein. In some examples, the resource manager 1425 is capable of, configured to, or operable to support a means for transmitting, to a UE, an indication of resource parameters for performing SRS transmissions during a slot including at least one SBFD symbol, at least one non-SBFD symbol, and a gap period between the at least one SBFD symbol and the at least one non-SBFD symbol. In some examples, the SRS manager 1430 is capable of, configured to, or operable to support a means for receiving multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one SBFD symbol, in the at least one non-SBFD symbol, or both, of the slot and a location of a SRS guard period relative to a transition between the SBFD symbol and the non-SBFD symbol.

In some examples, the gap manager 1435 is capable of, configured to, or operable to support a means for receiving the first subset of SRS transmissions and the second subset of SRS transmissions and dropping reception of an SRS transmission scheduled during the gap period according to the transmission scheme.

In some examples, the gap manager 1435 is capable of, configured to, or operable to support a means for receiving the first subset of SRS transmissions and dropping reception of the second subset of SRS transmissions according to the transmission scheme.

Figure 15:
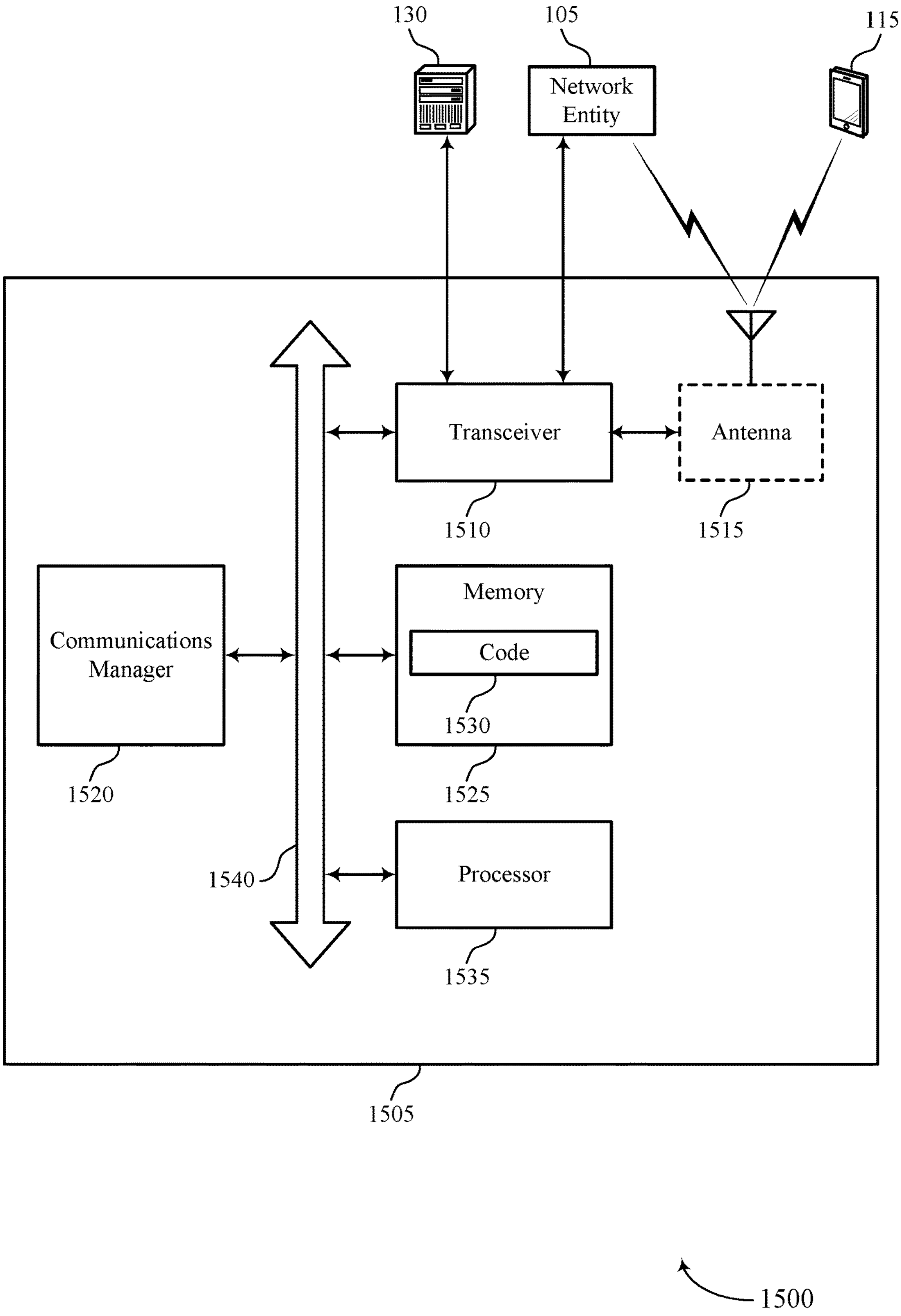
FIG. 15 shows a diagram of a system including a device that supports reference signal transmission in SBFD and non-SBFD slots in accordance with one or more aspects of the present disclosure.

FIG. 15 shows a diagram of a system 1500 including a device 1505 that supports reference signal transmission in SBFD and non-SBFD slots in accordance with one or more aspects of the present disclosure. The device 1505 may be an example of or include the components of a device 1205, a device 1305, or a network entity 105 as described herein. The device 1505 may communicate with one or more network entities 105, one or more UEs 115, or any combination thereof, which may include communications over one or more wired interfaces, over one or more wireless interfaces, or any combination thereof. The device 1505 may include components that support outputting and obtaining communications, such as a communications manager 1520, a transceiver 1510, an antenna 1515, at least one memory 1525, code 1530, and at least one processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. In some implementations, the transceiver 1510 may include one or more interfaces, such as one or more interfaces coupled with the one or more antennas 1515 that are configured to support various receiving or obtaining operations, or one or more interfaces coupled with the one or more antennas 1515 that are configured to support various transmitting or outputting operations, or a combination thereof. In some implementations, the transceiver 1510 may include or be configured for coupling with one or more processors or one or more memory components that are operable to perform or support operations based on received or obtained information or signals, or to generate information or other signals for transmission or other outputting, or any combination thereof. In some implementations, the transceiver 1510, or the transceiver 1510 and the one or more antennas 1515, or the transceiver 1510 and the one or more antennas 1515 and one or more processors or one or more memory components (e.g., the at least one processor 1535, the at least one memory 1525, or both), may be included in a chip or chip assembly that is installed in the device 1505. In some examples, the transceiver 1510 may be operable to support communications via one or more communications links (e.g., a communication link 125, a backhaul communication link 120, a midhaul communication link 162, a fronthaul communication link 168).

The at least one memory 1525 may include RAM, ROM, or any combination thereof. The at least one memory 1525 may store computer-readable, computer-executable code 1530 including instructions that, when executed by one or more of the at least one processor 1535, cause the device 1505 to perform various functions described herein. The code 1530 may be stored in a non-transitory computer-readable medium such as system memory or another type of memory. In some cases, the code 1530 may not be directly executable by a processor of the at least one processor 1535 but may cause a computer (e.g., when compiled and executed) to perform functions described herein. In some cases, the at least one memory 1525 may contain, among other things, a BIOS which may control basic hardware or software operation such as the interaction with peripheral components or devices. In some examples, the at least one processor 1535 may include multiple processors and the at least one memory 1525 may include multiple memories. One or more of the multiple processors may be coupled with one or more of the multiple memories which may, individually or collectively, be configured to perform various functions herein (for example, as part of a processing system).

The at least one processor 1535 may include an intelligent hardware device (e.g., a general-purpose processor, a DSP, an ASIC, a CPU, a GPU, a NPU, an FPGA, a microcontroller, a programmable logic device, discrete gate or transistor logic, a discrete hardware component, or any combination thereof). In some cases, the at least one processor 1535 may be configured to operate a memory array using a memory controller. In some other cases, a memory controller may be integrated into one or more of the at least one processor 1535. The at least one processor 1535 may be configured to execute computer-readable instructions stored in a memory (e.g., one or more of the at least one memory 1525) to cause the device 1505 to perform various functions (e.g., functions or tasks supporting reference signal transmission in SBFD and non-SBFD slots). For example, the device 1505 or a component of the device 1505 may include at least one processor 1535 and at least one memory 1525 coupled with one or more of the at least one processor 1535, the at least one processor 1535 and the at least one memory 1525 configured to perform various functions described herein. The at least one processor 1535 may be an example of a cloud-computing platform (e.g., one or more physical nodes and supporting software such as operating systems, virtual machines, or container instances) that may host the functions (e.g., by executing code 1530) to perform the functions of the device 1505. The at least one processor 1535 may be any one or more suitable processors capable of executing scripts or instructions of one or more software programs stored in the device 1505 (such as within one or more of the at least one memory 1525). In some examples, the at least one processor 1535 may include multiple processors and the at least one memory 1525 may include multiple memories. One or more of the multiple processors may be coupled with one or more of the multiple memories, which may, individually or collectively, be configured to perform various functions herein. In some examples, the at least one processor 1535 may be a component of a processing system, which may refer to a system (such as a series) of machines, circuitry (including, for example, one or both of processor circuitry (which may include the at least one processor 1535) and memory circuitry (which may include the at least one memory 1525)), or components, that receives or obtains inputs and processes the inputs to produce, generate, or obtain a set of outputs. The processing system may be configured to perform one or more of the functions described herein. As such, the at least one processor 1535 or a processing system including the at least one processor 1535 may be configured to, configurable to, or operable to cause the device 1505 to perform one or more of the functions described herein. Further, as described herein, being "configured to," being "configurable to," and being "operable to" may be used interchangeably and may be associated with a capability, when executing code stored in the at least one memory 1525 or otherwise, to perform one or more of the functions described herein.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the at least one memory 1525, the code 1530, and the at least one processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more UEs 115. In some examples, the communications manager 1520 may manage communications with other network entities 105, and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

The communications manager 1520 may support wireless communications in accordance with examples as disclosed herein. For example, the communications manager 1520 is capable of, configured to, or operable to support a means for transmitting, to a UE, an indication of resource parameters for the UE to perform SRS transmissions during a slot including at least one SBFD symbol and at least one non-SBFD symbol. The communications manager 1520 is capable of, configured to, or operable to support a means for receiving multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one non-SBFD symbol of the slot.

Additionally, or alternatively, the communications manager 1520 may support wireless communications in accordance with examples as disclosed herein. For example, the communications manager 1520 is capable of, configured to, or operable to support a means for transmitting, to a UE, an indication of resource parameters for performing SRS transmissions during a slot including at least one SBFD symbol, at least one non-SBFD symbol, and a gap period between the at least one SBFD symbol and the at least one non-SBFD symbol. The communications manager 1520 is capable of, configured to, or operable to support a means for receiving multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one SBFD symbol, in the at least one non-SBFD symbol, or both, of the slot and a location of a SRS guard period relative to a transition between the SBFD symbol and the non-SBFD symbol.

By including or configuring the communications manager 1520 in accordance with examples as described herein, the device 1505 may support techniques for improving multi-symbol SRS transmissions during mixed SBFD and non-SBFD symbol type slots according to a transmission scheme. The transmission scheme may define a transmit rule or drop rule for the SRS transmissions based on the slot including both SBFD and non-SBFD symbols.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. Although the communications manager 1520 is illustrated as a separate component, in some examples, one or more functions described with reference to the communications manager 1520 may be supported by or performed by the transceiver 1510, one or more of the at least one processor 1535, one or more of the at least one memory 1525, the code 1530, or any combination thereof (for example, by a processing system including at least a portion of the at least one processor 1535, the at least one memory 1525, the code 1530, or any combination thereof). For example, the code 1530 may include instructions executable by one or more of the at least one processor 1535 to cause the device 1505 to perform various aspects of reference signal transmission in SBFD and non-SBFD slots as described herein, or the at least one processor 1535 and the at least one memory 1525 may be otherwise configured to, individually or collectively, perform or support such operations.

Figure 16:
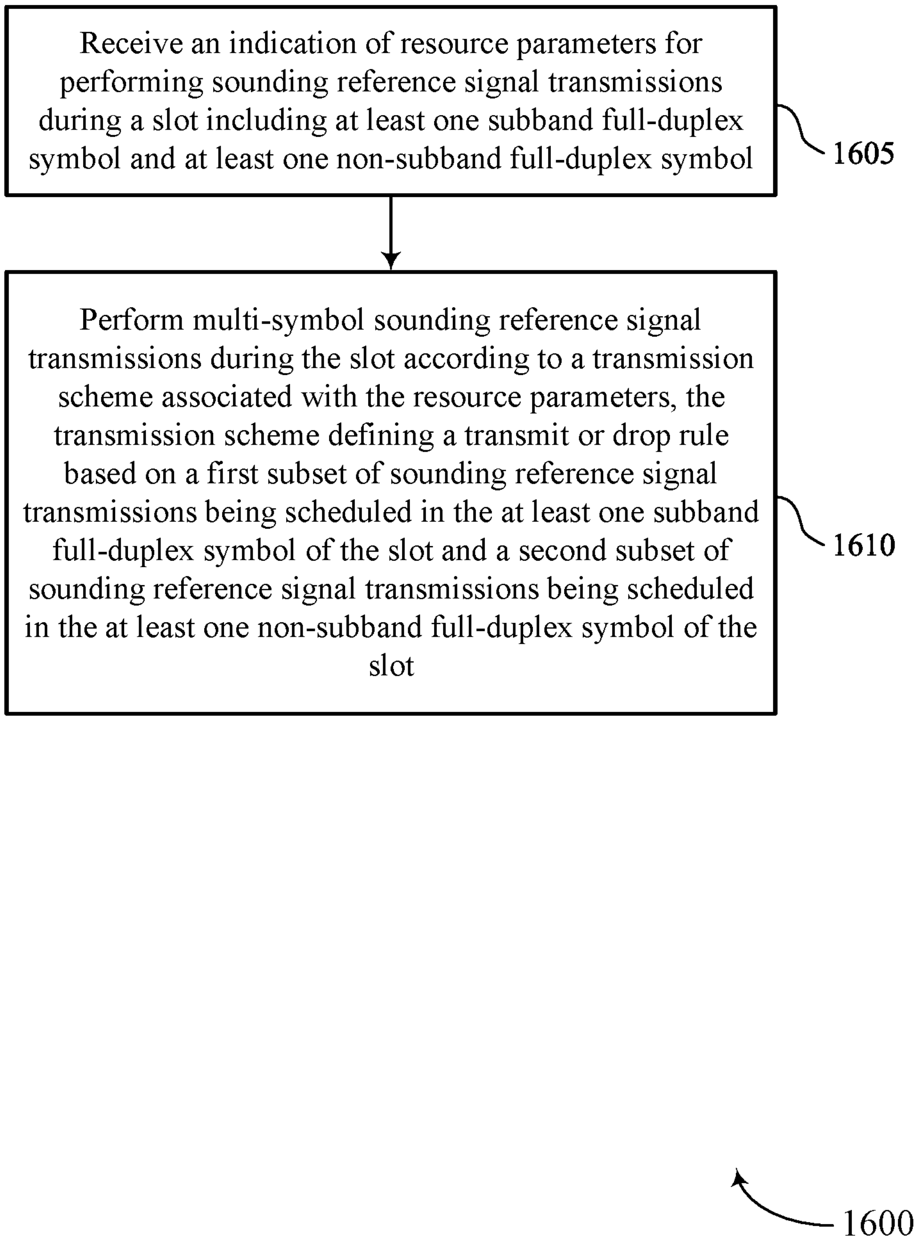
FIGS. 16 through 19 show flowcharts illustrating methods that support reference signal transmission in SBFD and non-SBFD slots in accordance with one or more aspects of the present disclosure.

FIG. 16 shows a flowchart illustrating a method 1600 that supports reference signal transmission in SBFD and non-SBFD slots in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving an indication of resource parameters for performing SRS transmissions during a slot including at least one SBFD symbol and at least one non-SBFD symbol. The operations of block 1605 may be performed in accordance with examples as disclosed herein. In some examples, aspects of the operations of 1605 may be performed by a resource manager 1025 as described with reference to FIG. 10.

At 1610, the method may include performing multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one non-SBFD symbol of the slot. The operations of block 1610 may be performed in accordance with examples as disclosed herein. In some examples, aspects of the operations of 1610 may be performed by an SRS manager 1030 as described with reference to FIG. 10.

Figure 17:
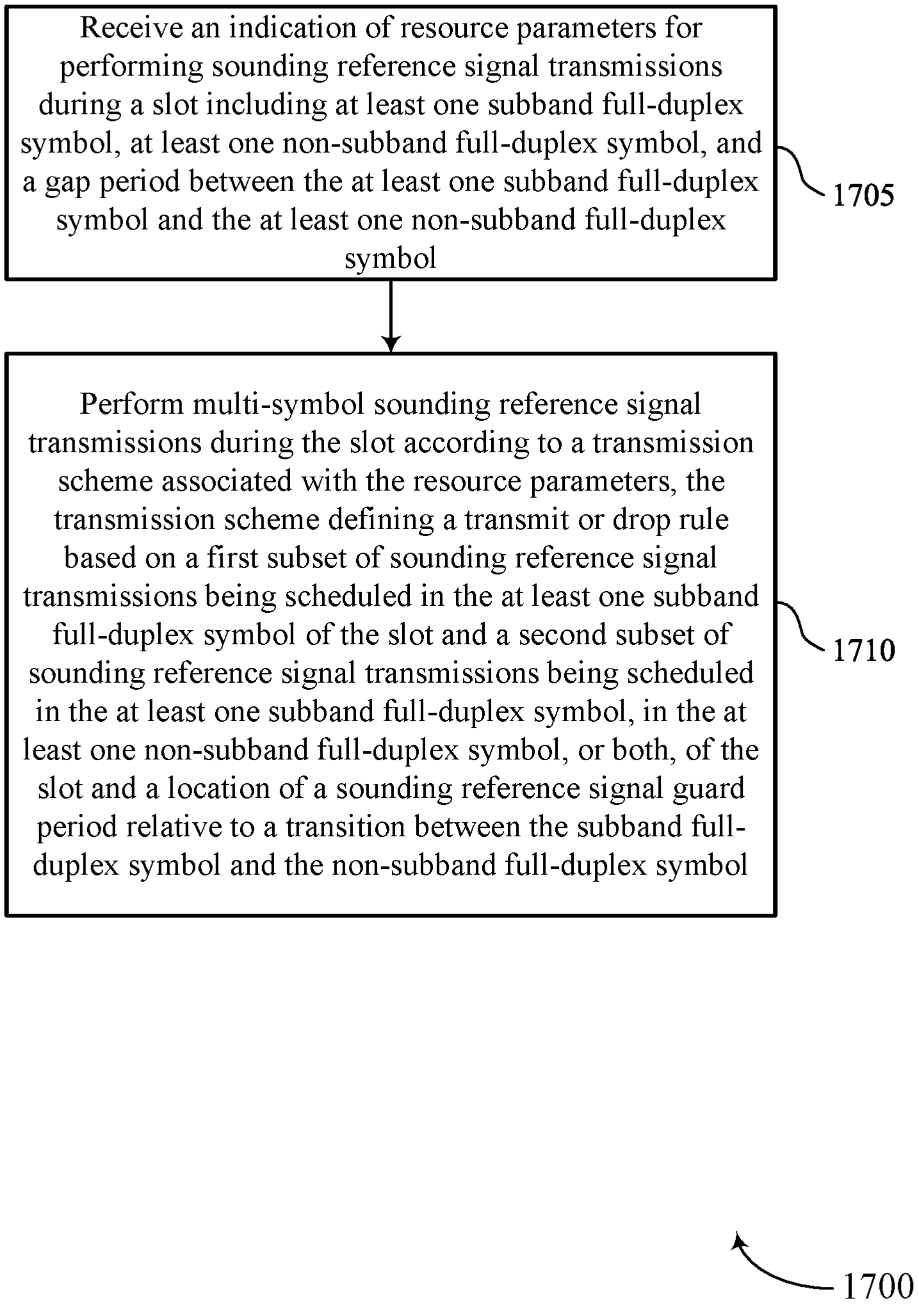

FIG. 17 shows a flowchart illustrating a method 1700 that supports reference signal transmission in SBFD and non-SBFD slots in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include receiving an indication of resource parameters for performing SRS transmissions during a slot including at least one SBFD symbol, at least one non-SBFD symbol, and a gap period between the at least one SBFD symbol and the at least one non-SBFD symbol. The operations of block 1705 may be performed in accordance with examples as disclosed herein. In some examples, aspects of the operations of 1705 may be performed by a resource manager 1025 as described with reference to FIG. 10.

At 1710, the method may include performing multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one SBFD symbol, in the at least one non-SBFD symbol, or both, of the slot and a location of a SRS guard period relative to a transition between the SBFD symbol and the non-SBFD symbol. The operations of block 1710 may be performed in accordance with examples as disclosed herein. In some examples, aspects of the operations of 1710 may be performed by an SRS manager 1030 as described with reference to FIG. 10.

Figure 18:
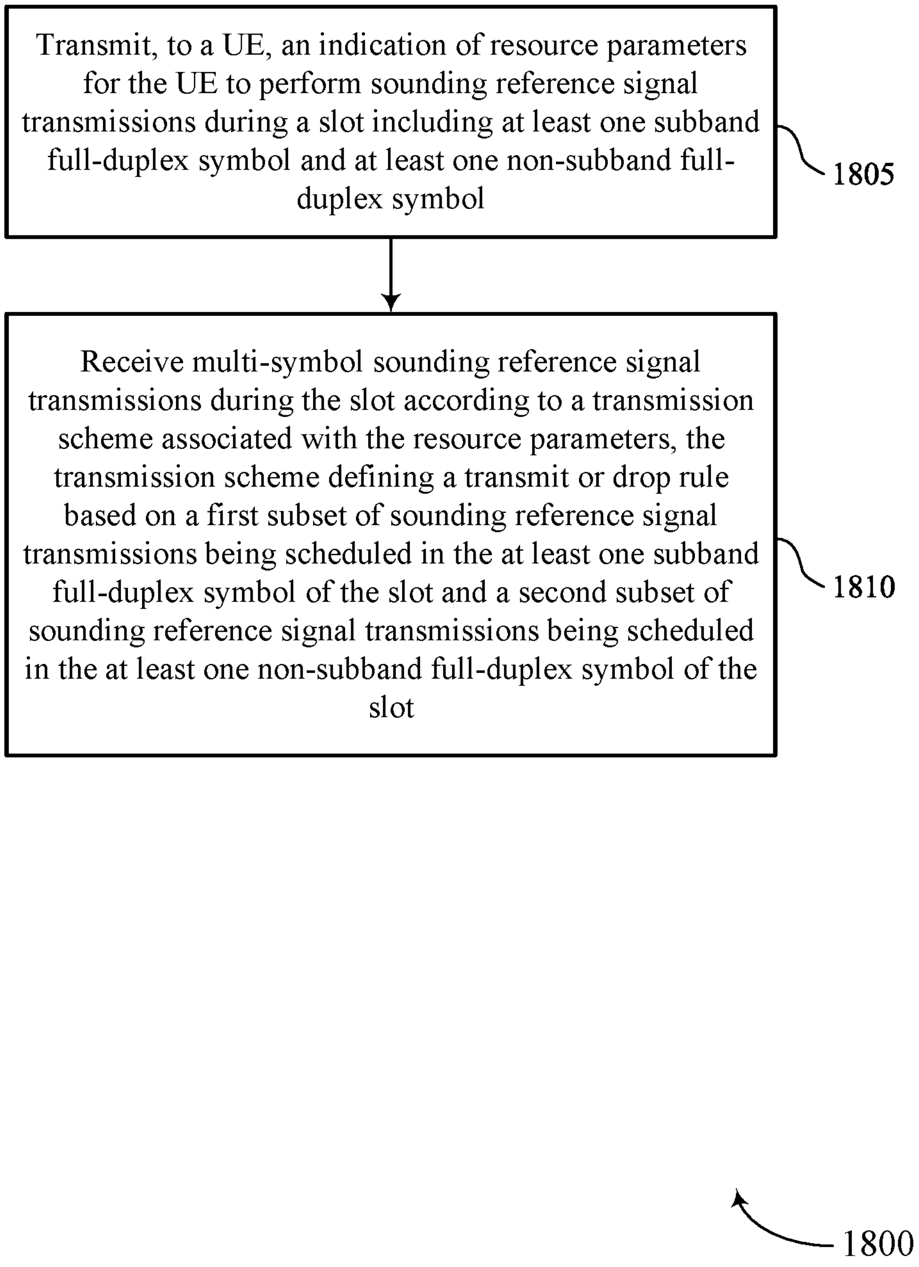

FIG. 18 shows a flowchart illustrating a method 1800 that supports reference signal transmission in SBFD and non-SBFD slots in accordance with aspects of the present disclosure. The operations of the method 1800 may be implemented by a network entity or its components as described herein. For example, the operations of the method 1800 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1805, the method may include transmitting, to a UE, an indication of resource parameters for the UE to perform SRS transmissions during a slot including at least one SBFD symbol and at least one non-SBFD symbol. The operations of block 1805 may be performed in accordance with examples as disclosed herein. In some examples, aspects of the operations of 1805 may be performed by a resource manager 1425 as described with reference to FIG. 14.

At 1810, the method may include receiving multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one non-SBFD symbol of the slot. The operations of block 1810 may be performed in accordance with examples as disclosed herein. In some examples, aspects of the operations of 1810 may be performed by an SRS manager 1430 as described with reference to FIG. 14.

Figure 19:
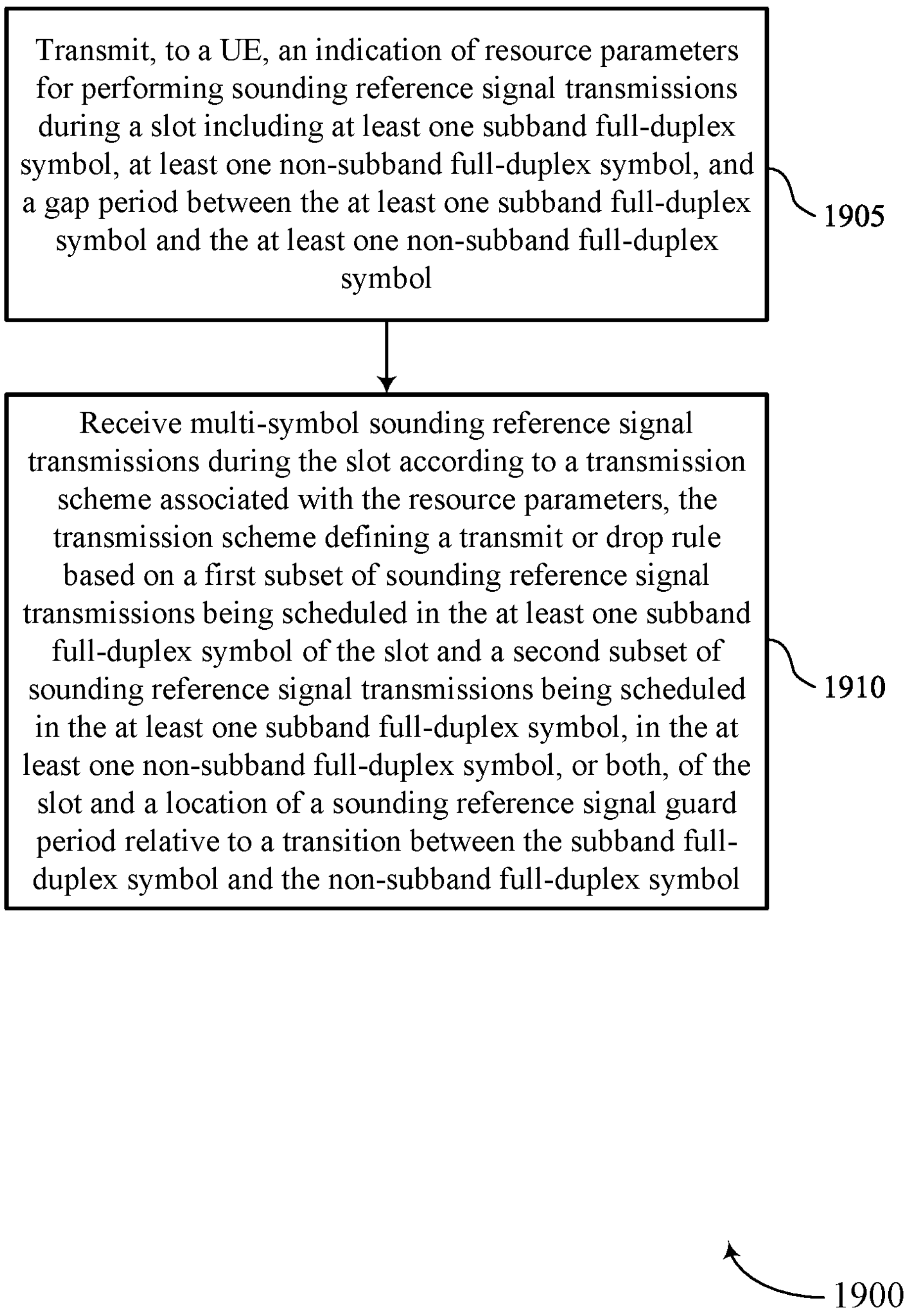

FIG. 19 shows a flowchart illustrating a method 1900 that supports reference signal transmission in SBFD and non-SBFD slots in accordance with aspects of the present disclosure. The operations of the method 1900 may be implemented by a network entity or its components as described herein. For example, the operations of the method 1900 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1905, the method may include transmitting, to a UE, an indication of resource parameters for performing SRS transmissions during a slot including at least one SBFD symbol, at least one non-SBFD symbol, and a gap period between the at least one SBFD symbol and the at least one non-SBFD symbol. The operations of block 1905 may be performed in accordance with examples as disclosed herein. In some examples, aspects of the operations of 1905 may be performed by a resource manager 1425 as described with reference to FIG. 14.

At 1910, the method may include receiving multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one SBFD symbol, in the at least one non-SBFD symbol, or both, of the slot and a location of a SRS guard period relative to a transition between the SBFD symbol and the non-SBFD symbol. The operations of block 1910 may be performed in accordance with examples as disclosed herein. In some examples, aspects of the operations of 1910 may be performed by an SRS manager 1430 as described with reference to FIG. 14.

The following provides an overview of aspects of the present disclosure:

Aspect 1: A method for wireless communications at a UE, comprising: receiving an indication of resource parameters for performing SRS transmissions during a slot comprising at least one SBFD symbol and at least one non-SBFD symbol; and performing multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one non-SBFD symbol of the slot.

Aspect 2: The method of aspect 1, wherein a frequency resource for the first subset of SRS transmissions and the second subset of SRS transmissions is within an uplink subband during the at least one SBFD symbol and during the at least one non-SBFD symbol, the transmission scheme is based on the frequency resource.

Aspect 3: The method of aspect 2, further comprising: dropping the first subset of SRS transmissions and the second subset of SRS transmissions according to the transmission scheme.

Aspect 4: The method of any of aspects 2 through 3, further comprising: dropping the second subset of SRS transmissions and performing the first subset of SRS transmissions according to the transmission scheme.

Aspect 5: The method of any of aspects 2 through 4, further comprising: dropping the first subset of SRS transmissions and performing the second subset of SRS transmissions according to the transmission scheme.

Aspect 6: The method of any of aspects 2 through 5, further comprising: performing the first subset of SRS transmissions and the second subset of SRS transmissions according to the transmission scheme.

Aspect 7: The method of aspect 6, wherein the transmission scheme is based on a phase continuity being maintained, a same set of transmission parameters being applied, a presence or an absence of a guard period, or a combination thereof, between the first subset of SRS transmissions and the second subset of SRS transmissions.

Aspect 8: The method of any of aspects 2 through 7, wherein the transmission scheme is based on a presence or an absence of a guard period between the at least one SBFD symbol and the at least one non-SBFD symbol.

Aspect 9: The method of any of aspects 1 through 8, wherein a frequency resource for the first subset of SRS transmissions and the second subset of SRS transmissions is wider than an uplink subband during the at least one SBFD symbol and is within an uplink bandwidth during the at least one non-SBFD symbol, the transmission scheme is based on the frequency resource.

Aspect 10: The method of aspect 9, further comprising: dropping the first subset of SRS transmissions and the second subset of SRS transmissions according to the transmission scheme.

Aspect 11: The method of any of aspects 9 through 10, further comprising: dropping the first subset of SRS transmissions and performing the second subset of SRS transmissions according to the transmission scheme.

Aspect 12: The method of any of aspects 9 through 11, further comprising: performing the first subset of SRS transmissions during the at least one SBFD symbol and the second subset of SRS transmissions during the at least one non-SBFD symbol according to a truncated SRS sequence, the truncated SRS sequence based on the transmission scheme.

Aspect 13: The method of any of aspects 9 through 12, further comprising: performing the first subset of SRS transmissions during the at least one SBFD symbol and the second subset of SRS transmissions during the at least one non-SBFD symbol according to an updated SRS sequence, wherein a length of the updated SRS sequence is based on the transmission scheme within an uplink subband frequency resource.

Aspect 14: The method of any of aspects 1 through 13, wherein the multi-symbol SRS transmissions comprise frequency hopping with a first hop of the frequency hopping comprising the first subset of SRS transmissions during the at least one SBFD symbol and a second hop of the frequency hopping comprising the second subset of SRS transmissions during the at least one non-SBFD symbol, the transmission scheme is based on the frequency hopping.

Aspect 15: The method of aspect 14, further comprising: performing the first subset of SRS transmissions and the second subset of SRS transmissions according to the transmission scheme.

Aspect 16: The method of aspect 15, further comprising: performing or dropping one or more instances of the second subset of SRS transmissions according to a presence or an absence of a guard period scheduled between the at least one SBFD symbol and the at least one non-SBFD symbol.

Aspect 17: The method of any of aspects 1 through 16, wherein the multi-symbol SRS transmissions comprise frequency hopping with a first hop of the frequency hopping comprising the first subset of SRS transmissions during the at least one SBFD symbol and a second hop of the frequency hopping comprising a first instance of the second subset of SRS transmissions during the at least one SBFD symbol and a second instance of the second subset of SRS transmissions during the at least one non-SBFD symbol, the transmission scheme is based on the frequency hopping.

Aspect 18: The method of aspect 17, further comprising: performing the first subset of SRS transmissions and the second subset of SRS transmissions according to the transmission scheme.

Aspect 19: The method of aspect 18, wherein the transmission scheme is based on a phase continuity being maintained, a same set of transmission parameters being applied, a presence or an absence of a guard period, or a combination thereof, between the first subset of SRS transmissions and the second subset of SRS transmissions.

Aspect 20: The method of any of aspects 17 through 19, further comprising: performing the first subset of SRS transmissions and dropping the first instance, the second instance, or both, of the second subset of SRS transmissions according to the transmission scheme.

Aspect 21: A method for wireless communications at a UE, comprising: receiving an indication of resource parameters for performing SRS transmissions during a slot comprising at least one SBFD symbol, at least one non-SBFD symbol, and a gap period between the at least one SBFD symbol and the at least one non-SBFD symbol; and performing multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one SBFD symbol, in the at least one non-SBFD symbol, or both, of the slot and a location of a SRS guard period relative to a transition between the at least one SBFD symbol and the at least one non-SBFD symbol.

Aspect 22: The method of aspect 21, further comprising: performing the first subset of SRS transmissions and the second subset of SRS transmissions and dropping an SRS transmission scheduled during the gap period according to the transmission scheme.

Aspect 23: The method of any of aspects 21 through 22, further comprising: performing the first subset of SRS transmissions and dropping the second subset of SRS transmissions according to the transmission scheme.

Aspect 24: A method for wireless communications at a network entity, comprising: transmitting, to a UE, an indication of resource parameters for the UE to perform SRS transmissions during a slot comprising at least one SBFD symbol and at least one non-SBFD symbol; and receiving multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one non-SBFD symbol of the slot.

Aspect 25: The method of aspect 24, wherein a frequency resource for the first subset of SRS transmissions and the second subset of SRS transmissions is within an uplink subband during the at least one SBFD symbol and during the at least one non-SBFD symbol, the transmission scheme is based on the frequency resource.

Aspect 26: The method of aspect 25, further comprising: dropping reception of the first subset of SRS transmissions and the second subset of SRS transmissions according to the transmission scheme.

Aspect 27: The method of any of aspects 25 through 26, further comprising: dropping reception of the second subset of SRS transmissions and receiving the first subset of SRS transmissions according to the transmission scheme.

Aspect 28: The method of any of aspects 25 through 27, further comprising: dropping reception of the first subset of SRS transmissions and receiving the second subset of SRS transmissions according to the transmission scheme.

Aspect 29: The method of any of aspects 25 through 28, further comprising: receiving the first subset of SRS transmissions and the second subset of SRS transmissions according to the transmission scheme.

Aspect 30: The method of aspect 29, wherein the transmission scheme is based on a phase continuity being maintained, a same set of transmission parameters being applied, a presence or an absence of a guard period, or a combination thereof, between the first subset of SRS transmissions and the second subset of SRS transmissions.

Aspect 31: The method of any of aspects 25 through 30, wherein the transmission scheme is based on a presence or an absence of a guard period between the at least one SBFD symbol and the at least one non-SBFD symbol.

Aspect 32: The method of any of aspects 24 through 31, wherein a frequency resource for the first subset of SRS transmissions and the second subset of SRS transmissions is wider than an uplink subband during the at least one SBFD symbol and is within an uplink bandwidth during the at least one non-SBFD symbol, the transmission scheme is based on the frequency resource.

Aspect 33: The method of aspect 32, further comprising: dropping reception of the first subset of SRS transmissions and the second subset of SRS transmissions according to the transmission scheme.

Aspect 34: The method of any of aspects 32 through 33, further comprising: dropping reception of the first subset of SRS transmissions and receiving the second subset of SRS transmissions according to the transmission scheme.

Aspect 35: The method of any of aspects 32 through 34, further comprising: receiving the first subset of SRS transmissions during the at least one SBFD symbol and the second subset of SRS transmissions during the at least one non-SBFD symbol according to a truncated SRS sequence, the truncated SRS sequence based on the transmission scheme.

Aspect 36: The method of any of aspects 32 through 35, further comprising: receiving the first subset of SRS transmissions during the at least one SBFD symbol and the second subset of SRS transmissions during the at least one non-SBFD symbol according to an updated SRS sequence, wherein a length of the updated SRS sequence is based on the transmission scheme within an uplink subband frequency resource.

Aspect 37: The method of any of aspects 24 through 36, wherein the multi-symbol SRS transmissions comprise frequency hopping with a first hop of the frequency hopping comprising the first subset of SRS transmissions during the at least one SBFD symbol and a second hop of the frequency hopping comprising the second subset of SRS transmissions during the at least one non-SBFD symbol, the transmission scheme is based on the frequency hopping.

Aspect 38: The method of aspect 37, further comprising: receiving the first subset of SRS transmissions and the second subset of SRS transmissions according to the transmission scheme.

Aspect 39: The method of any of aspects 37 through 38, further comprising: receiving or dropping reception of one or more instances of the second subset of SRS transmissions according to a presence or an absence of a guard period between the at least one SBFD symbol and the at least one non-SBFD symbol.

Aspect 40: The method of any of aspects 24 through 39, wherein the multi-symbol SRS transmissions comprise frequency hopping with a first hop of the frequency hopping comprising the first subset of SRS transmissions during the at least one SBFD symbol and a second hop of the frequency hopping comprising a first instance of the second subset of SRS transmissions during the at least one SBFD symbol and a second instance of the second subset of SRS transmissions during the at least one non-SBFD symbol, the transmission scheme is based on the frequency hopping.

Aspect 41: The method of aspect 40, further comprising: receiving the first subset of SRS transmissions and the second subset of SRS transmissions according to the transmission scheme.

Aspect 42: The method of aspect 41, wherein the transmission scheme is based on a phase continuity being maintained, a same set of transmission parameters being applied, a presence or an absence of a guard period, or a combination thereof, between the first subset of SRS transmissions and the second subset of SRS transmissions.

Aspect 43: The method of any of aspects 40 through 42, further comprising: receiving the first subset of SRS transmissions and dropping the first instance, the second instance, or both, of the second subset of SRS transmissions according to the transmission scheme.

Aspect 44: A method for wireless communications at a network entity, comprising: transmitting, to a UE, an indication of resource parameters for performing SRS transmissions during a slot comprising at least one SBFD symbol, at least one non-SBFD symbol, and a gap period between the at least one SBFD symbol and the at least one non-SBFD symbol; and receiving multi-symbol SRS transmissions during the slot according to a transmission scheme associated with the resource parameters, the transmission scheme defining a transmit or drop rule based on a first subset of SRS transmissions being scheduled in the at least one SBFD symbol of the slot and a second subset of SRS transmissions being scheduled in the at least one SBFD symbol, in the at least one non-SBFD symbol, or both, of the slot and a location of a SRS guard period relative to a transition between the SBFD symbol and the non-SBFD symbol.

Aspect 45: The method of aspect 44, further comprising: receiving the first subset of SRS transmissions and the second subset of SRS transmissions and dropping reception of an SRS transmission scheduled during the gap period according to the transmission scheme.

Aspect 46: The method of any of aspects 44 through 45, further comprising: receiving the first subset of SRS transmissions and dropping reception of the second subset of SRS transmissions according to the transmission scheme.

Aspect 47: A UE for wireless communications, comprising one or more memories storing processor-executable code, and one or more processors coupled (e.g., operatively, communicatively, functionally, electronically, or electrically) with the one or more memories and individually or collectively operable to execute the code (e.g., directly, indirectly, after pre-processing, without pre-processing) to cause the UE to perform a method of any of aspects 1 through 20.

Aspect 48: A UE for wireless communications, comprising at least one means for performing a method of any of aspects 1 through 20.

Aspect 49: A non-transitory computer-readable medium storing code for wireless communications, the code comprising instructions executable (e.g., directly, indirectly, after pre-processing, without pre-processing) by a processor to perform a method of any of aspects 1 through 20.

Aspect 50: A UE for wireless communications, comprising one or more memories storing processor-executable code, and one or more processors coupled (e.g., operatively, communicatively, functionally, electronically, or electrically) with the one or more memories and individually or collectively operable to execute the code (e.g., directly, indirectly, after pre-processing, without pre-processing) to cause the UE to perform a method of any of aspects 21 through 23.

Aspect 51: A UE for wireless communications, comprising at least one means for performing a method of any of aspects 21 through 23.

Aspect 52: A non-transitory computer-readable medium storing code for wireless communications, the code comprising instructions executable by a processor (e.g., directly, indirectly, after pre-processing, without pre-processing) to perform a method of any of aspects 21 through 23.

Aspect 53: A network entity for wireless communications, comprising one or more memories storing processor-executable code, and one or more processors coupled (e.g., operatively, communicatively, functionally, electronically, or electrically) with the one or more memories and individually or collectively operable to execute the code (e.g., directly, indirectly, after pre-processing, without pre-processing) to cause the network entity to perform a method of any of aspects 24 through 43.

Aspect 54: A network entity for wireless communications, comprising at least one means for performing a method of any of aspects 24 through 43.

Aspect 55: A non-transitory computer-readable medium storing code for wireless communications, the code comprising instructions executable by a processor (e.g., directly, indirectly, after pre-processing, without pre-processing) to perform a method of any of aspects 24 through 43.

Aspect 56: A network entity for wireless communications, comprising one or more memories storing processor-executable code, and one or more processors coupled (e.g., operatively, communicatively, functionally, electronically, or electrically) with the one or more memories and individually or collectively operable to execute the code (e.g., directly, indirectly, after pre-processing, without pre-processing) to cause the network entity to perform a method of any of aspects 44 through 46.

Aspect 57: A network entity for wireless communications, comprising at least one means for performing a method of any of aspects 44 through 46.

Aspect 58: A non-transitory computer-readable medium storing code for wireless communications, the code comprising instructions executable by a processor (e.g., directly, indirectly, after pre-processing, without pre-processing) to perform a method of any of aspects 44 through 46.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, a NPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., including a list of items prefaced by a phrase such as "at least one of" or "one or more of") indicates an inclusive list such that, for example, a list of at least one of A, B, or C means, e.g., A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" or "identify" or "identifying" encompasses a variety of actions and, therefore, "determining" or "identifying" can include calculating, computing, processing, deriving, investigating, looking up (such as via looking up in a table, a database, or another data structure), and/or ascertaining. Also, "determining" or "identifying" can include receiving (such as receiving information or signaling, e.g., receiving information or signaling for determining, receiving information, or signaling for identifying), and/or accessing (such as accessing data in a memory, or accessing information). Also, "determining" or "identifying" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive an indication of resource parameters for performing sounding reference signal transmissions during a slot comprising at least one subband full-duplex symbol and at least one non-subband full-duplex symbol; and perform multi-symbol sounding reference signal transmissions during the slot according to a transmission scheme associated with the resource parameters, the transmission scheme defining a transmit or drop rule based on a first subset of sounding reference signal transmissions being scheduled in the at least one subband full-duplex symbol of the slot and a second subset of sounding reference signal transmissions being scheduled in the at least one non-subband full-duplex symbol of the slot.

2. The UE of claim 1, wherein a frequency resource for the first subset of sounding reference signal transmissions and the second subset of sounding reference signal transmissions is within an uplink subband during the at least one subband full-duplex symbol and during the at least one non-subband full-duplex symbol, the transmission scheme is based on the frequency resource.

3. The UE of claim 2, wherein the one or more processors are individually or collectively further operable to execute the code to cause the UE to:

drop the first subset of sounding reference signal transmissions and the second subset of sounding reference signal transmissions according to the transmission scheme.

4. The UE of claim 2, wherein the one or more processors are individually or collectively further operable to execute the code to cause the UE to:

drop the second subset of sounding reference signal transmissions and performing the first subset of sounding reference signal transmissions according to the transmission scheme.

5. The UE of claim 2, wherein the one or more processors are individually or collectively further operable to execute the code to cause the UE to:

drop the first subset of sounding reference signal transmissions and performing the second subset of sounding reference signal transmissions according to the transmission scheme.

6. The UE of claim 2, wherein the one or more processors are individually or collectively further operable to execute the code to cause the UE to:

perform the first subset of sounding reference signal transmissions and the second subset of sounding reference signal transmissions according to the transmission scheme.

7. The UE of claim 6, wherein the transmission scheme is based on a phase continuity being maintained, a same set of transmission parameters being applied, a presence or an absence of a guard period, or a combination thereof, between the first subset of sounding reference signal transmissions and the second subset of sounding reference signal transmissions.

8. The UE of claim 2, wherein the transmission scheme is based on a presence or an absence of a guard period between the at least one subband full-duplex symbol and the at least one non-subband full-duplex symbol.

9. The UE of claim 1, wherein a frequency resource for the first subset of sounding reference signal transmissions and the second subset of sounding reference signal transmissions is wider than an uplink subband during the at least one subband full-duplex symbol and is within an uplink bandwidth during the at least one non-subband full-duplex symbol, the transmission scheme is based on the frequency resource.

10. The UE of claim 9, wherein the one or more processors are individually or collectively further operable to execute the code to cause the UE to:

drop the first subset of sounding reference signal transmissions and the second subset of sounding reference signal transmissions according to the transmission scheme.

11. The UE of claim 9, wherein the one or more processors are individually or collectively further operable to execute the code to cause the UE to:

drop the first subset of sounding reference signal transmissions and performing the second subset of sounding reference signal transmissions according to the transmission scheme.

12. The UE of claim 9, wherein the one or more processors are individually or collectively further operable to execute the code to cause the UE to:

perform the first subset of sounding reference signal transmissions during the at least one subband full-duplex symbol and the second subset of sounding reference signal transmissions during the at least one non-subband full-duplex symbol according to a truncated sounding reference signal sequence, the truncated sounding reference signal sequence based on the transmission scheme.

13. The UE of claim 9, wherein the one or more processors are individually or collectively further operable to execute the code to cause the UE to:

perform the first subset of sounding reference signal transmissions during the at least one subband full-duplex symbol and the second subset of sounding reference signal transmissions during the at least one non-subband full-duplex symbol according to an updated sounding reference signal sequence, wherein a length of the updated sounding reference signal sequence is based on the transmission scheme within an uplink subband frequency resource.

14. The UE of claim 1, wherein the multi-symbol sounding reference signal transmissions comprise frequency hopping with a first hop of the frequency hopping comprising the first subset of sounding reference signal transmissions during the at least one subband full-duplex symbol and a second hop of the frequency hopping comprising the second subset of sounding reference signal transmissions during the at least one non-subband full-duplex symbol, the transmission scheme is based on the frequency hopping.

15. The UE of claim 14, wherein the one or more processors are individually or collectively further operable to execute the code to cause the UE to:

perform the first subset of sounding reference signal transmissions and the second subset of sounding reference signal transmissions according to the transmission scheme.

16. The UE of claim 15, wherein the one or more processors are individually or collectively further operable to execute the code to cause the UE to:

perform or drop one or more instances of the second subset of sounding reference signal transmissions according to a presence or an absence of a guard period scheduled between the at least one subband full-duplex symbol and the at least one non-subband full-duplex symbol.

17. The UE of claim 1, wherein the multi-symbol sounding reference signal transmissions comprise frequency hopping with a first hop of the frequency hopping comprising the first subset of sounding reference signal transmissions during the at least one subband full-duplex symbol and a second hop of the frequency hopping comprising a first instance of the second subset of sounding reference signal transmissions during the at least one subband full-duplex symbol and a second instance of the second subset of sounding reference signal transmissions during the at least one non-subband full-duplex symbol, the transmission scheme is based on the frequency hopping.

18. The UE of claim 17, wherein the one or more processors are individually or collectively further operable to execute the code to cause the UE to:

perform the first subset of sounding reference signal transmissions and the second subset of sounding reference signal transmissions according to the transmission scheme.

19. The UE of claim 18, wherein the transmission scheme is based on a phase continuity being maintained, a same set of transmission parameters being applied, a presence or an absence of a guard period, or a combination thereof, between the first subset of sounding reference signal transmissions and the second subset of sounding reference signal transmissions.

20. The UE of claim 17, wherein the one or more processors are individually or collectively further operable to execute the code to cause the UE to:

perform the first subset of sounding reference signal transmissions and drop the first instance, the second instance, or both, of the second subset of sounding reference signal transmissions according to the transmission scheme.

21. A user equipment (UE), comprising:

one or more memories storing processor-executable code; and one or more processors coupled with the one or more memories and individually or collectively operable to execute the code to cause the UE to:

receive an indication of resource parameters for performing sounding reference signal transmissions during a slot comprising at least one subband full-duplex symbol, at least one non-subband full-duplex symbol, and a gap period between the at least one subband full-duplex symbol and the at least one non-subband full-duplex symbol; and perform multi-symbol sounding reference signal transmissions during the slot according to a transmission scheme associated with the resource parameters, the transmission scheme defining a transmit or drop rule based on:

a first subset of sounding reference signal transmissions being scheduled in the at least one subband full-duplex symbol of the slot;

a second subset of sounding reference signal transmissions being scheduled in the at least one subband full-duplex symbol, in the at least one non-subband full-duplex symbol, or both, of the slot; and a location of a sounding reference signal guard period relative to a transition between the at least one subband full-duplex symbol and the at least one non-subband full-duplex symbol.

22. The UE of claim 21, wherein the one or more processors are individually or collectively further operable to execute the code to cause the UE to:

perform the first subset of sounding reference signal transmissions and the second subset of sounding reference signal transmissions and drop a sounding reference signal transmission scheduled during the gap period according to the transmission scheme.

23. The UE of claim 21, wherein the one or more processors are individually or collectively further operable to execute the code to cause the UE to:

perform the first subset of sounding reference signal transmissions and drop the second subset of sounding reference signal transmissions according to the transmission scheme.

24. A network entity, comprising:

one or more memories storing processor-executable code; and one or more processors coupled with the one or more memories and individually or collectively operable to execute the code to cause the network entity to:

transmit, to a user equipment (UE), an indication of resource parameters for the UE to perform sounding reference signal transmissions during a slot comprising at least one subband full-duplex symbol and at least one non-subband full-duplex symbol; and receive multi-symbol sounding reference signal transmissions during the slot according to a transmission scheme associated with the resource parameters, the transmission scheme defining a transmit or drop rule based on a first subset of sounding reference signal transmissions being scheduled in the at least one subband full-duplex symbol of the slot and a second subset of sounding reference signal transmissions being scheduled in the at least one non-subband full-duplex symbol of the slot.

25. The network entity of claim 24, wherein a frequency resource for the first subset of sounding reference signal transmissions and the second subset of sounding reference signal transmissions is within an uplink subband during the at least one subband full-duplex symbol and during the at least one non-subband full-duplex symbol, the transmission scheme is based on the frequency resource.

26. The network entity of claim 25, wherein the one or more processors are individually or collectively further operable to execute the code to cause the network entity to:

drop reception of the first subset of sounding reference signal transmissions and the second subset of sounding reference signal transmissions according to the transmission scheme.

27. The network entity of claim 25, wherein the one or more processors are individually or collectively further operable to execute the code to cause the network entity to:

drop reception of the second subset of sounding reference signal transmissions and receiving the first subset of sounding reference signal transmissions according to the transmission scheme.

28. The network entity of claim 25, wherein the one or more processors are individually or collectively further operable to execute the code to cause the network entity to:

drop reception of the first subset of sounding reference signal transmissions and receiving the second subset of sounding reference signal transmissions according to the transmission scheme.

29. The network entity of claim 25, wherein the one or more processors are individually or collectively further operable to execute the code to cause the network entity to:

receive the first subset of sounding reference signal transmissions and the second subset of sounding reference signal transmissions according to the transmission scheme.

30. A network entity, comprising:

one or more memories storing processor-executable code; and one or more processors coupled with the one or more memories and individually or collectively operable to execute the code to cause the network entity to:

transmit, to a user equipment (UE), an indication of resource parameters for performing sounding reference signal transmissions during a slot comprising at least one subband full-duplex symbol, at least one non-subband full-duplex symbol, and a gap period between the at least one subband full-duplex symbol and the at least one non-subband full-duplex symbol; and receive multi-symbol sounding reference signal transmissions during the slot according to a transmission scheme associated with the resource parameters, the transmission scheme defining a transmit or drop rule based on:

a first subset of sounding reference signal transmissions being scheduled in the at least one subband full-duplex symbol of the slot;

a second subset of sounding reference signal transmissions being scheduled in the at least one subband full-duplex symbol, in the at least one non-subband full-duplex symbol, or both, of the slot; and a location of a sounding reference signal guard period relative to a transition between the at least one subband full-duplex symbol and the at least one non-subband full-duplex symbol.

* * * * *